United States Patent
Karampatsis et al.

(10) Patent No.: US 11,363,509 B2
(45) Date of Patent: *Jun. 14, 2022

(54) V2X COMMUNICATION OVER MULTIPLE RADIO ACCESS TYPES

(71) Applicant: Lenovo (Singapore) PTE. LTD., New Tech Park (SG)

(72) Inventors: Dimitrios Karampatsis, Ruislip (GB); Prateek Basu Mallick, Oberursel (DE); Genadi Velev, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 11 days.

This patent is subject to a terminal disclaimer.

(21) Appl. No.: 17/114,280

(22) Filed: Dec. 7, 2020

(65) Prior Publication Data

US 2021/0092658 A1    Mar. 25, 2021

Related U.S. Application Data

(63) Continuation of application No. 16/379,215, filed on Apr. 9, 2019, now Pat. No. 10,863,401.
(Continued)

(51) Int. Cl.
*H04W 36/04* (2009.01)
*H04W 76/15* (2018.01)
(Continued)

(52) U.S. Cl.
CPC ............ *H04W 36/04* (2013.01); *H04W 4/40* (2018.02); *H04W 4/44* (2018.02); *H04W 8/245* (2013.01);
(Continued)

(58) Field of Classification Search
CPC ....... H04W 36/04; H04W 8/245; H04W 4/44; H04W 48/18; H04W 72/1242;
(Continued)

(56) References Cited

U.S. PATENT DOCUMENTS

2008/0046963 A1    2/2008  Grayson et al.
2010/0112946 A1    5/2010  Urushiyama
(Continued)

FOREIGN PATENT DOCUMENTS

WO    2016/206290 A1    12/2016
WO    2016/209197 A1    12/2016
(Continued)

OTHER PUBLICATIONS

Jacob, Richard, Norman Franchi, and Gerhard Fettweis. "Hybrid V2X communications: multi-RAT as enabler for connected autonomous driving." 2018 IEEE 29th Annual International Symposium on Personal, Indoor and Mobile Radio Communications (PIMRC). IEEE, 2018. (Year: 2018).*
(Continued)

*Primary Examiner* — Sharad Rampuria
(74) *Attorney, Agent, or Firm* — Kunzler Bean & Adamson

(57) ABSTRACT

Apparatuses, methods, and systems are disclosed for V2X communication over multiple radio access types. One method includes establishing, via a remote unit, multiple network connections for communication with a mobile network and multiple network connections for V2X communication with other remote units over multiple radio access types. The method includes receiving a request to transmit a V2X communication. The method includes determining whether the V2X communication is to be transmitted via a communication with a mobile network or a V2X communication with other remote units. The method includes determining a radio access type of the multiple radio access types for transmitting the V2X communication via V2X communication. The method includes selecting a cell that supports V2X resource management for the V2X (Continued)

communication. The method includes requesting resources via the cell for transmitting the V2X communication.

12 Claims, 13 Drawing Sheets

Related U.S. Application Data

(60) Provisional application No. 62/654,955, filed on Apr. 9, 2018.

(51) Int. Cl.

| | | |
|---|---|---|
| *H04W 4/40* | (2018.01) | |
| *H04W 36/22* | (2009.01) | |
| *H04W 72/04* | (2009.01) | |
| *H04W 76/14* | (2018.01) | |
| *H04W 48/04* | (2009.01) | |
| *H04W 72/12* | (2009.01) | |
| *H04W 48/18* | (2009.01) | |
| *H04W 4/44* | (2018.01) | |
| *H04W 8/24* | (2009.01) | |
| *H04W 88/06* | (2009.01) | |
| *H04W 88/10* | (2009.01) | |
| *H04W 88/08* | (2009.01) | |

(52) U.S. Cl.
CPC ............ *H04W 36/22* (2013.01); *H04W 48/04* (2013.01); *H04W 48/18* (2013.01); *H04W 72/0453* (2013.01); *H04W 72/1242* (2013.01); *H04W 76/14* (2018.02); *H04W 76/15* (2018.02); *H04W 88/06* (2013.01); *H04W 88/085* (2013.01); *H04W 88/10* (2013.01)

(58) Field of Classification Search
CPC . H04W 48/04; H04W 76/14; H04W 72/0453; H04W 36/22; H04W 4/40; H04W 76/15; H04W 88/085; H04W 88/10; H04W 88/06; H04W 60/00; H04W 36/00; H04W 36/0005; H04W 36/0007; H04W 36/0009; H04W 36/0016; H04W 36/03; H04B 7/18541; H04L 47/767

See application file for complete search history.

(56) References Cited

U.S. PATENT DOCUMENTS

| | | |
|---|---|---|
| 2012/0026880 A1 | 2/2012 | Miller et al. |
| 2015/0092673 A1 | 4/2015 | Singh et al. |
| 2017/0150490 A1 | 5/2017 | Chen et al. |
| 2017/0272384 A1 | 9/2017 | Lee et al. |
| 2017/0295579 A1 | 10/2017 | Sheng |
| 2018/0092065 A1 | 3/2018 | Sheng |
| 2019/0052446 A1 | 2/2019 | Cheng et al. |
| 2019/0059071 A1 | 2/2019 | Khoryaev et al. |
| 2019/0150082 A1 | 5/2019 | Kedalagudde et al. |
| 2019/0159223 A1 | 5/2019 | Park et al. |
| 2019/0230485 A1 | 7/2019 | Hahn |
| 2019/0313222 A1 | 10/2019 | Karampatsis et al. |
| 2019/0313305 A1 | 10/2019 | Karampatsis et al. |
| 2019/0313359 A1 | 10/2019 | Lee et al. |
| 2019/0313469 A1 | 10/2019 | Karampatsis et al. |
| 2019/0394624 A1 | 12/2019 | Karampatsis et al. |
| 2020/0092685 A1* | 3/2020 | Fehrenbach ............ H04W 4/46 |

FOREIGN PATENT DOCUMENTS

| | | |
|---|---|---|
| WO | 2017/052683 A1 | 3/2017 |
| WO | 2017/147904 A1 | 9/2017 |
| WO | 2017/189035 A1 | 11/2017 |
| WO | 2018/022225 A1 | 2/2018 |

OTHER PUBLICATIONS

3GPP, "3rd Generation Partnership Project; Technical Specification Group Services and System Aspects; Architecture enhancements for V2X services (Release 15)", 3GPP TS 23.285 V15.0.0, Mar. 2018, pp. 1-36.
3GPP, "3rd Generation Partnership Project; Technical Specification Group Services and System Aspects Enhancement of 3GPP support for V2X scenarios; Stage 1 (Release 15)", 3GPP TS 22.186 V15.2.0, Sep. 2017, pp. 1-16.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0, Mar. 2018, pp. 1-341.
3GPP, "3rd Generation Partnership Project; Technical Specification Group Core Network and Terminals; Non-Access-Stratum (NAS) functions related to Mobile Station (MS) in idle mode (Release 15)", 3GPP TS 23.122 V15.3.0, Mar. 2018, pp. 1-58.
3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.
3GPP, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018, pp. 1-786.
3GPP, "3rd Generation Partnership Project; Technical Specification Group Services and System Aspects; Service requirements for V2X services; Stage 1 (Release 14)", 3GPP TS 22.185 V14.3.0, Mar. 2017, pp. 1-14.
3GPP, "3rd Generation Partnership Project; Technical Specification Group Services and System Aspects; Study on architecture enhancements for EPS and 5G System to support advanced V2X services (Release 16)", 3GPP TR 23.786 V0.4.0, Mar. 2018, pp. 1-23.
3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.
3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.6.0, Mar. 2018, pp. 1-50.
3GPP, 3rd Generation Partnership Project; Technical Specification Group Core Network and Terminals; User Equipment (UE) to V2X control function' protocol aspects; Stage 3 (Release 14), 3GPP TS 23.386 V14.3.0, Dec. 2017, pp. 1-35.
LG Electronics, "Correction for carrier frequency selection and mapping between V2X service and V2X frequencies", 3GPP TSG-CT WG1 Meeting #106 C1-174643, Oct. 23-27, 2017, pp. 1-4.
U.S. Appl. No. 16/379,270, Office Action Summary, dated Jun. 24, 2021, pp. 1-17.

* cited by examiner

V2X COMMUNICATION OVER MULTIPLE RADIO ACCESS TYPES

CROSS-REFERENCE TO RELATED APPLICATIONS

This application is a continuation application of U.S. patent application Ser. No. 16/379,215 filed on Apr. 9, 2019, which claims priority to U.S. Patent Application Ser. No. 62/654,955 entitled "METHODS FOR SUPPORTING V2X SERVICES OVER MULTIPLE RADIO ACCESS TECHNOLOGIES" and filed on Apr. 9, 2018 for Dimitrios Karampatsis, which is incorporated herein by reference in its entirety.

FIELD

The subject matter disclosed herein relates generally to wireless communications and more particularly relates to V2X communication over multiple radio access types.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NS-SAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, V2X communication may be used. In such networks, devices may not be compatible with one another.

BRIEF SUMMARY

Methods for V2X communication over multiple radio access types are disclosed. Apparatuses and systems also perform the functions of the apparatus. One embodiment of a method includes establishing, via a remote unit, a first plurality of network connections for direct communication with a mobile communication network and a second plurality of network connections for direct vehicle-to-everything communication with other remote units over a plurality of radio access types. In certain embodiments, the method includes receiving a request to transmit a vehicle-to-everything communication. In various embodiments, the method includes determining whether the vehicle-to-everything communication is to be transmitted via a direct communication with a mobile communication network or a direct vehicle-to-everything communication with other remote units. In some embodiments, the method includes determining a radio access type of the plurality of radio access types for transmitting the vehicle-to-everything communication via a direct vehicle-to-everything communication. In certain embodiments, the method includes selecting a cell of a plurality of cells that supports vehicle-to-everything resource management for the vehicle-to-everything communication via a direct vehicle-to-everything communication and the radio access type. In various embodiments, the method includes requesting resources via the cell for transmitting the vehicle-to-everything communication via a direct vehicle-to-everything communication using the radio access type.

One apparatus for V2X communication over multiple radio access types includes a processor that: establishes a first plurality of network connections for direct communication with a mobile communication network and a second plurality of network connections for direct vehicle-to-everything communication with other remote units over a plurality of radio access types; receives a request to transmit a vehicle-to-everything communication; determines whether the vehicle-to-everything communication is to be transmitted via a direct communication with a mobile communication network or a direct vehicle-to-everything communication with other remote units; determines a radio access type of the plurality of radio access types for transmitting the vehicle-to-everything communication via a direct vehicle-to-everything communication; selects a cell of a plurality of cells that supports vehicle-to-everything resource management for the vehicle-to-everything communication via a direct vehicle-to-everything communication and the radio access type; and requests resources via the cell for transmitting the vehicle-to-everything communication via a direct vehicle-to-everything communication using the radio access type.

One method for V2X communication over multiple radio access types includes transmitting, from a remote unit, information indicating a vehicle-to-everything capability of the remote unit. In various embodiments, the method includes receiving a response to the information indicating the vehicle-to-everything capability of the remote unit. In such embodiments, the response indicates whether the remote unit is authorized to use the vehicle-to-everything capability.

One apparatus for V2X communication over multiple radio access types includes a transmitter that transmits information indicating a vehicle-to-everything capability of the apparatus. In some embodiments, the apparatus includes a receiver that receives a response to the information indicating the vehicle-to-everything capability of the apparatus. In such embodiments, the response indicates whether the apparatus is authorized to use the vehicle-to-everything capability.

One method for V2X communication over multiple radio access types includes receiving information indicating a vehicle-to-everything capability of a remote unit. In various embodiments, the method includes transmitting a response to the information indicating the vehicle-to-everything capability of the remote unit. In such embodiments, the response indicates whether the remote unit is authorized to use the vehicle-to-everything capability.

One apparatus for V2X communication over multiple radio access types includes a receiver that receives information indicating a vehicle-to-everything capability of a remote unit. In some embodiments, a transmitter that transmits a response to the information indicating the vehicle-to-everything capability of the remote unit. In such embodiments, the response indicates whether the remote unit is authorized to use the vehicle-to-everything capability.

One method for V2X communication over multiple radio access types includes configuring a remote unit with information indicating a plurality of mobile networks and a radio access type of a plurality of radio access types for direct vehicle-to-everything communication corresponding to each mobile network of the plurality of mobile networks. In various embodiments, the method includes supporting a plurality of vehicle-to-everything applications. In such embodiments, each vehicle-to-everything application of the plurality of vehicle-to-everything applications communicates via a direct vehicle-to-everything communication using a corresponding radio access type of the plurality of radio access types.

One apparatus for V2X communication over multiple radio access types includes a processor that: configures the apparatus with information indicating a plurality of mobile networks and a radio access type of a plurality of radio access types for direct vehicle-to-everything communication corresponding to each mobile network of the plurality of mobile networks; and supports a plurality of vehicle-to-everything applications, wherein each vehicle-to-everything application of the plurality of vehicle-to-everything applications communicates via a direct vehicle-to-everything communication using a corresponding radio access type of the plurality of radio access types.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
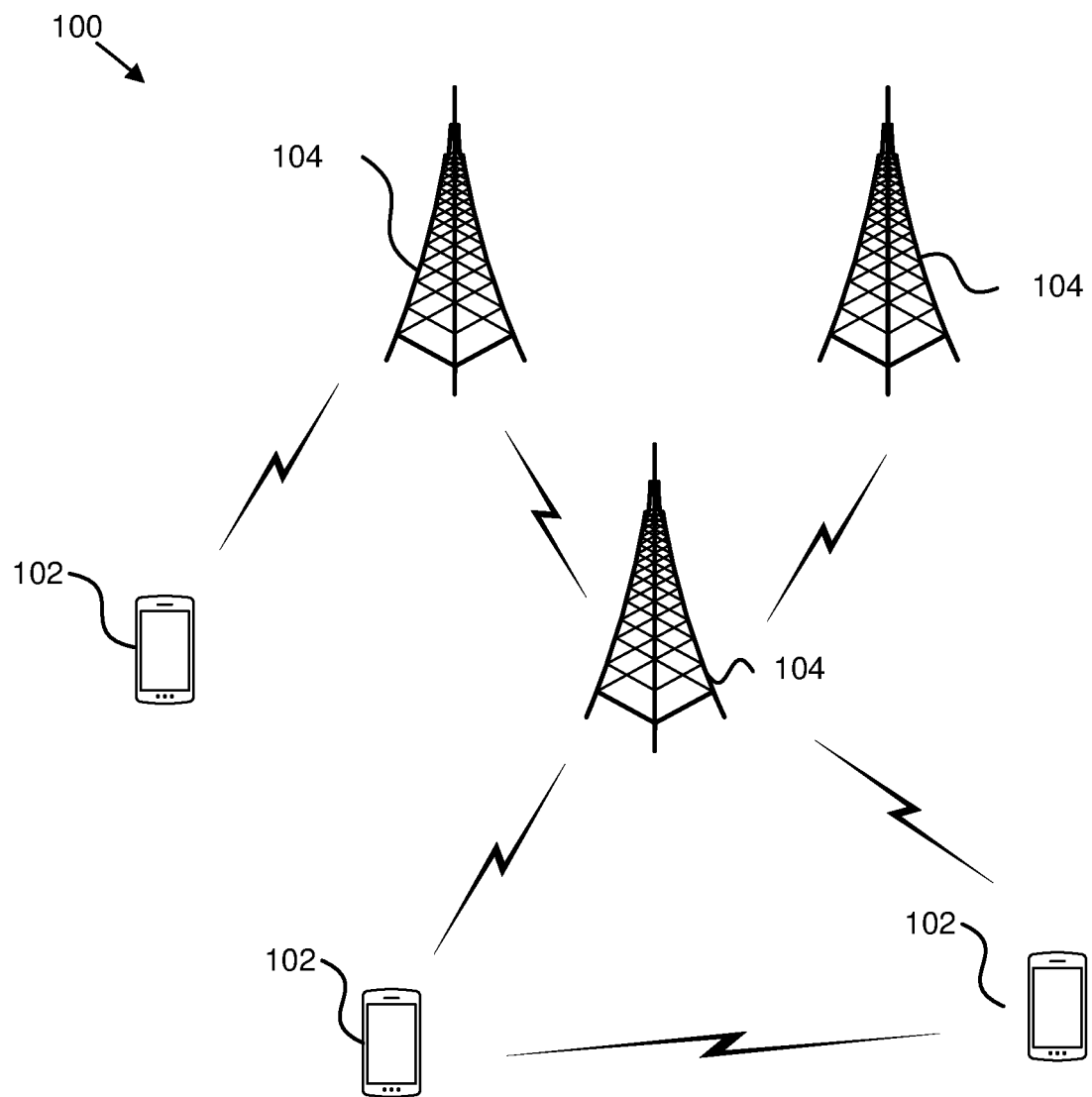
FIG. 1 is a schematic block diagram illustrating one embodiment of a wireless communication system for V2X communication over multiple radio access types.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for V2X communication over multiple radio access types. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may establish a first plurality of network connections for direct communication with a mobile communication network and a second plurality of network connections for direct vehicle-to-everything communication with other remote units 102 over a plurality of radio access types. In certain embodiments, the remote unit 102 may receive a request to transmit a vehicle-to-everything communication. In various embodiments, the remote unit 102 may determine whether the vehicle-to-everything communication is to be transmitted via a direct communication with a mobile communication network or a direct vehicle-to-everything communication with other remote units 102. In some embodiments, the remote unit 102 may determine a radio access type of the plurality of radio access types for transmitting the vehicle-to-everything communication via a direct vehicle-to-everything communication. In certain embodiments, the remote unit 102 may select a cell of a plurality of cells that supports vehicle-to-everything resource management for the vehicle-to-everything communication via a direct vehicle-to-everything communication and the radio access type. In various embodiments, the remote unit 102 may request resources via the cell for transmitting the vehicle-to-everything communication via a direct vehicle-to-everything communication using the radio access type. Accordingly, the remote unit 102 may be used for V2X communication over multiple radio access types.

In various embodiments, a remote unit 102 may transmit information indicating a vehicle-to-everything capability of the remote unit 102. In various embodiments, the remote unit 102 may receive a response to the information indicating the vehicle-to-everything capability of the remote unit 102. In such embodiments, the response indicates whether the remote unit 102 is authorized to use the vehicle-to-everything capability. Accordingly, the remote unit 102 may be used for V2X communication over multiple radio access types.

In certain embodiments, a network unit 104 may receive information indicating a vehicle-to-everything capability of a remote unit 102. In various embodiments, the network unit 104 may transmit a response to the information indicating the vehicle-to-everything capability of the remote unit 102. In such embodiments, the response indicates whether the remote unit 102 is authorized to use the vehicle-to-everything capability. Accordingly, the network unit 104 may be used for V2X communication over multiple radio access types.

In one embodiment, a remote unit 102 may configure a remote unit with information indicating a plurality of mobile networks and a radio access type of a plurality of radio access types for direct vehicle-to-everything communication corresponding to each mobile network of the plurality of mobile networks. In various embodiments, the remote unit 102 may support a plurality of vehicle-to-everything applications. In such embodiments, each vehicle-to-everything application of the plurality of vehicle-to-everything applications communicates via a direct vehicle-to-everything communication using a corresponding radio access type of the plurality of radio access types. Accordingly, the remote unit 102 may be used for V2X communication over multiple radio access types.

Figure 2:
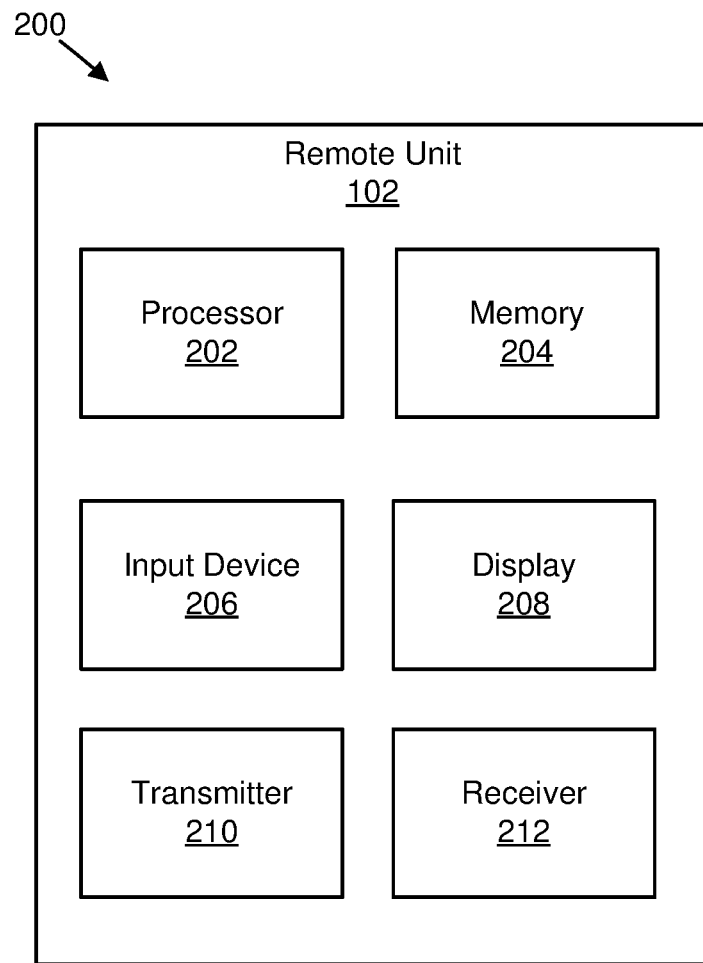
FIG. 2 is a schematic block diagram illustrating one embodiment of an apparatus that may be used for V2X communication over multiple radio access types.

FIG. 2 depicts one embodiment of an apparatus 200 that may be used for V2X communication over multiple radio access types. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: establish a first plurality of network connections for direct communication with a mobile communication network and a second plurality of network connections for direct vehicle-to-everything communication with other remote units over a plurality of radio access types; receive a request to transmit a vehicle-to-everything communication; determine whether the vehicle-to-everything communication is to be transmitted via a direct communication with a mobile communication network or a direct vehicle-to-everything communication with other remote units 102; determine a radio access type of the plurality of radio access types for transmitting the vehicle-to-everything communication via a direct vehicle-to-everything communication; select a cell of a plurality of cells that supports vehicle-to-everything resource management for the vehicle-to-everything communication via a direct vehicle-to-everything communication and the radio access type; and request resources via the cell for transmitting the vehicle-to-everything communication via a direct vehicle-to-everything communication using the radio access type.

In certain embodiments, the processor 202 may: configure the apparatus 200 with information indicating a plurality of mobile networks and a radio access type of a plurality of radio access types for direct vehicle-to-everything communication corresponding to each mobile network of the plurality of mobile networks; and support a plurality of vehicle-to-everything applications, wherein each vehicle-to-everything application of the plurality of vehicle-to-everything applications communicates via a direct vehicle-to-everything communication using a corresponding radio access type of the plurality of radio access types. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In certain embodiments, the transmitter 210 transmits information indicating a vehicle-to-everything capability of the apparatus 200. In some embodiments, the receiver 212 receives a response to the information indicating the vehicle-to-everything capability of the apparatus 200. In such embodiments, the response indicates whether the apparatus 200 is authorized to use the vehicle-to-everything capability.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
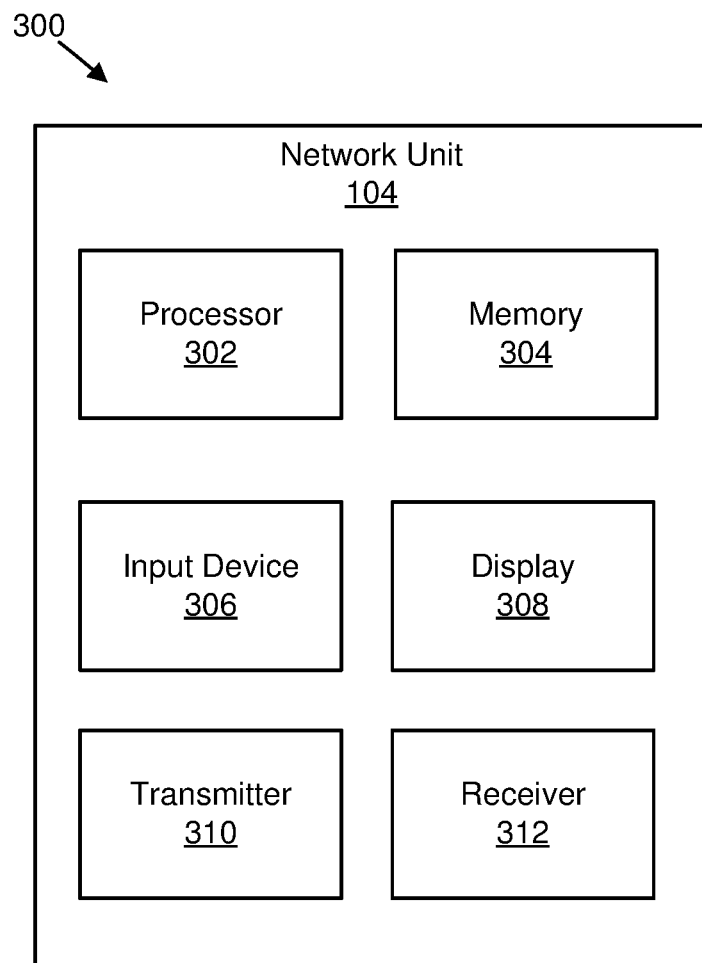
FIG. 3 is a schematic block diagram illustrating one embodiment of an apparatus that may be used for V2X communication over multiple radio access types.

FIG. 3 depicts one embodiment of an apparatus 300 that may be used for V2X communication over multiple radio access types. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 receives information indicating a vehicle-to-everything capability of a remote unit 102. In some embodiments, the transmitter 310 transmits a response to the information indicating the vehicle-to-everything capability of the remote unit 102. In such embodiments, the response indicates whether the remote unit 102 is authorized to use the vehicle-to-everything capability.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, if a UE is to send a V2X message over a PC5 interface, the UE may determine whether a cell supports certain carrier frequencies for V2X communications. In such embodiments, if the cell does not support the carrier frequencies the UE may have to search for a cell that supports the carrier frequencies. The search may take into account a list of PLMNs that the UE is enabled to use for PC5 communications. In certain embodiments, a UE searching for a cell to support carrier frequencies for V2X communication may first look for the cell in its own PLMN and, if the UE is not successful, the UE may look in cells of equivalent PLMNs until a cell is found that supports V2X communications. In such embodiments, if the UE is outside coverage of 3GPP specified RATs (e.g., LTE and NR cells are unavailable) on a sidelink V2X frequency, then the UE may perform sidelink communication in another manner, such as according to SL-V2X-Preconfiguration.

In various embodiments, a 5G capable UE may support both EPS V2X communications (e.g., such as for safety services) and 5G V2X enhanced services (e.g., such as for vehicle platooning). In some embodiments, if 5G V2X capable UEs need to communicate with EPS V2X capable UEs, the UEs may use E-UTRA over Uu to send a V2X communication over legacy PC5 (e.g., E-UTRA).

As may be appreciated, a UE may have a number of services that require 5G radio access technology and such services will not be available if a 5G V2X capable UE uses E-UTRA and EPC due to communicating a V2X message over E-UTRA PC5. As described herein, a UE may be able to determine a best cell to camp in to support V2X communications over PC5 over both E-UTRA and NR without interrupting other V2X services. Furthermore, as described herein a UE may identify how to transmit eV2X messages either based on an enhanced E-UTRA radio or based on a NR radio.

In certain embodiments, during registration in an EPS, a UE may include in an initial attach request an indication that the UE is V2X capable. Moreover, an MME may check with an HSS to determine whether the UE is authorized to use V2X services and may provide an indication to an eNB that indicates whether the UE is authorized to use V2X. Based on this indication the eNB may identify whether the UE is enabled to use a scheduled mode of operation in a cell.

In various embodiments, such as in 5G, a UE may support both E-UTRA PC5 and NR PC5. Furthermore, in some embodiments, the UE may support a version of E-UTRA that is enhanced (e.g., enhanced E-UTRA), such as with higher data rates than standard E-UTRA. In certain embodiments, an NG-RAN node (e.g., eNB, gNB) may support scheduling resources for PC5 messages sent via NR, E-UTRA, and/or an enhanced E-UTRA. Accordingly, an NG-RAN node may indicate whether a UE is authorized to use E-UTRA PC5 and/or NR PC5 in a cell.

In some embodiments, a UE may use a single RAT and/or system (e.g., EPS or 5GS) over a Uu reference point (e.g., macro cell with a single RAT), and a RAN node may be able to configure the UE for multiple PC5 types of communication (e.g., E-UTRA PC5 and/or NR PC5). As may be appreciated, a UE may use a dual connectivity feature (e.g., a secondary cell operating in the same or in a different RAT than a master cell) together with PC5 communication.

In various embodiments, a V2X capable UE may provide its V2X capabilities during an initial registration and/or mobility registration procedure with a 5GS. For example, a UE may include information indicating that V2X is supported and/or the UE may provide an explicit indication of V2X services that the UE supports (e.g., safety V2X services using E-UTRA PC5, enhanced V2X services using NR PC5, etc.). In certain embodiments, a registration request message may be authorized by a network function (e.g., UDM, PCF, AUSF, or another network function) that may determine (e.g., check) whether a UE is authorized to use V2X services and may provide an indication indicating whether the UE is authorized to use PC5 communications over E-UTRA PC5 and/or NR PC5. In such embodiments, the network function may provide the indication to an AMF to indicate which PC5 types the UE is allowed to use. Moreover, the AMF may then provide information to an NG-RAN to indicate whether the UE is authorized to use V2X services over PC5 and may provide information indicating the RATs supported.

Figure 4:
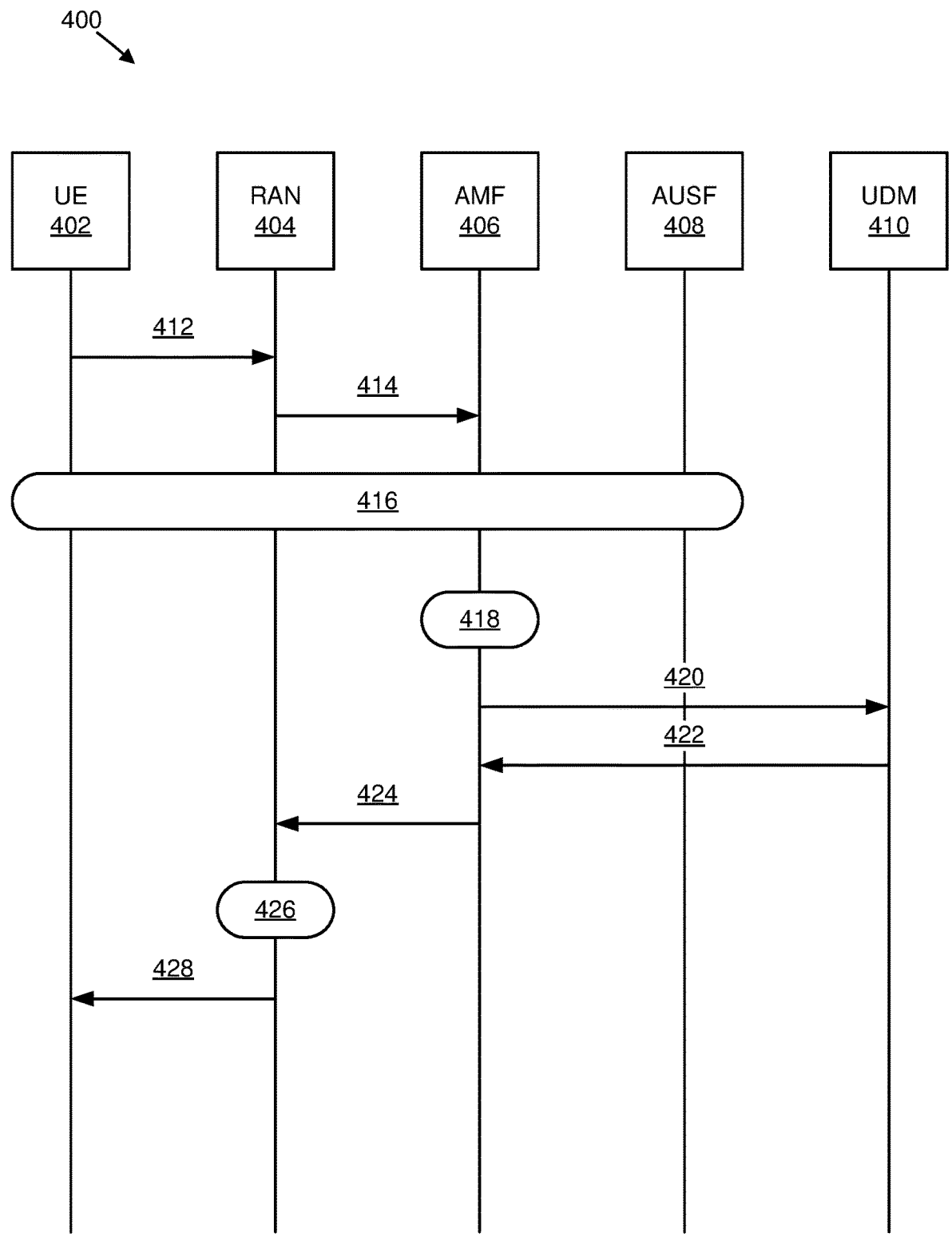
FIG. 4 is a schematic block diagram illustrating one embodiment of communications including a registration procedure with V2X authorization.

FIG. 4 is a schematic block diagram illustrating one embodiment of communications 400 including a registration procedure with V2X authorization. The communications 400 include messages transmitted between a UE 402 (e.g., V2X UE), a RAN 404 (e.g., NG-RAN), an AMF 406, an AUSF 408, and a UDM 410. Each communication described herein may include one or more messages.

In certain embodiments, in a first communication 412 transmitted from the UE 402 to the RAN 404, the UE 402 may transmit an initial registration request that includes an indication that the UE 402 is V2X capable. In some embodiments, as part of the first communication 412, the UE 402 may include a generic indication (e.g., a single bit) or the UE 402 may be more explicit and indicate that the UE 402 supports basic (e.g., EPS based) and/or enhanced (e.g., 5G based) V2X capabilities.

In various embodiments, in a second communication 414 transmitted from the RAN 404 to the AMF 406, the RAN 404 may transmit information that indicates AN parameters and/or information from the initial registration request received by the RAN 404 from the UE 402.

In some embodiments, authentication and/or authorization messages 416 may be transmitted between the UE 402, the RAN 404, the AMF 406, and/or the AUSF 408 to perform authentication and/or authorization of the UE 402.

In certain embodiments, UDM selection 418 is performed by the AMF 406.

In various embodiments, in a third communication 420 transmitted from the AMF 406 to the UDM 410, the AMF 406 may forward the V2X capability of the UE 402 to the UDM 410, such as within a Nudm_service request message.

In some embodiments, in a fourth communication 422 transmitted from the UDM 410 to the AMF 406, the UDM 410, based on subscription information, may provide an indication to the AMF 406 that the UE 402 is authorized to use E-UTRA PC5 and/or NR PC5. As part of the fourth communication 422, the UDM 410 may also provide an indication that the UE 402 is enhanced E-UTRA capable. In certain embodiments, the AMF 406 may store information about the authorization of the UE 402 to use E-UTRA PC5 and/or NR PC5 in the UE's 402 MM context. In various embodiments, the AMF 406 may forward information about the authorization of the UE 402 together with the UE's 402 MM context to other AMFs or MMEs. In some embodiments, the AMF 406 may process and/or store information about the authorization of the UE 402 to facilitate signaling the information within the UE 402 context (e.g., RAN 404) to the RAN 404 (e.g., NG-RAN node).

In certain embodiments, in a fifth communication 424 transmitted from the AMF 406 to the RAN 404, the AMF 406 may send the indication about the authorization to use E-UTRA PC5 and/or NR PC5 to the RAN 404. The indication may be within the UE's 402 RAN context encapsulated in a message as part of various parameters. In various embodiments, the AMF 406 may send the indication about the authorization to use E-UTRA PC5 and/or NR PC5 during each transition from a CM-idle state to a CM-connected state.

In some embodiments, the RAN 404 stores 426 (e.g., in the UE 402 context) information indicating whether the UE 402 is authorized to support EPS services, NR V2X services, E-UTRA PC5, and/or NR PC5.

In certain embodiments, in a sixth communication 428 transmitted from the RAN 404 to the UE 402, the RAN 404 may transmit a registration accept message to the UE 402.

As may be appreciated, while the communications 412 through 426 are described for registration with a 5GS, similar communications may be used for registration with an EPS.

In various embodiments, after the UE 402 receives the sixth communication 428, the UE 402 may proceed to subscribe to V2X services from a V2X control function and/or may receive authorization to use PC5 in a PLMN.

In some embodiments, authorization information may include the following (either provided by a V2X control function and/or preconfigured at the UE 402): 1) An authorization policy: authorization to perform PC5 communication with a list of PLMNs for which the UE 402 is served by an E-UTRAN; and/or a list of geographical areas in which the UE 402 is authorized to perform PC5 communications at times that the UE 402 is not served by E-UTRA; 2) Radio configuration parameters at times during which the UE 402 is not served by E-UTRAN: includes the radio parameters with geographical areas and an indication of whether they are "operator managed" or "non-operator managed" (e.g., the UE 402 may use the radio parameters to perform V2X communications over PC5 reference point at times in which the UE 402 is "not served by E-UTRAN" only if the UE 402 can reliably locate itself in a corresponding geographical area, otherwise, the UE 402 is not authorized to transmit); 3) Policy parameters: mapping of destination layer 2 IDs (e.g., in a PC5 message) to V2X application IDs; mapping of per prose packet priority and packet delay budget; and/or mapping of V2X application IDs to V2X frequencies with geographical areas.

In certain embodiments, because a 5G UE 402 may support dual PC5 capability (e.g., both E-UTRA PC5 and NR PC5 simultaneously), the UE 402 may require configuration information to be aware of which PLMNs the UE 402 is allowed to perform PC5 communications over E-UTRA or NR. This configuration information may be needed by the UE 402 if served by the RAN 404 and also if not served by the RAN 404. In various embodiments, the UE 402 may be configured with a list of PLMNs that the UE 402 is authorized to perform PC5 communications over E-UTRA, enhanced E-UTRA, and/or NR. In some embodiments, if not served by the RAN 404, the UE 402 may be configured with a list of geographical areas that the UE 402 is authorized to perform PC5 communications over NR and/or E-UTRA.

In various embodiments, the UE 402 may be provided with information indicating times during which a V2X application triggers to send a message over PC5. In such embodiments, the UE 402 may need to identify if V2X messages need to be sent over E-UTRA PC5, enhanced E-UTRA PC5, or NR PC5. Such embodiments may include configuring the UE 402 with a mapping between V2X application IDs and PC5 RATs. In some embodiments, a V2X application ID may map to one or more PC5 RATs.

In some embodiments, a V2X application may indicate a priority of a V2X message to a V2X layer in the UE 402. In such embodiments, based on the priority requested, the UE 402 may determine whether the V2X message will be sent over E-UTRA or NR RAT based on priority requirements. As may be appreciated, information used to determine whether the V2X message will be sent over E-UTRA or NR RAT may be configured at the UE 402 (e.g., the UE 402 may be configured by a network with a mapping of a priority to a selected PC5 RAT (e.g., E-UTRA or NR).

As described herein, the UE 402 may include the following configuration parameters: a list of PLMNs in which the UE 402 is authorized to perform E-UTRA, enhanced E-UTRA, and/or NR over PC5; a list of geographical areas in which the UE 402 is authorized to perform E-UTRA, enhanced E-UTRA, and/or NR over PC5; a mapping of V2X application IDs to PC5 RATs; and/or a mapping of a priority requested by a V2X application to one or more PC5 RATs. The configuration parameters may be configured in the UE 402 using NAS protocol messages, using RRC protocol messages, and/or using other protocols carried over user plane IP protocols.

In certain embodiments, the UE 402 may be configured with authorization to perform E-UTRA or NR and a gNB and/or eNB may decide dynamically whether enhanced E-UTRA may be used to transmit a V2X message. In one example, a cell may be configured with information that indicates that for a specific carrier frequency enhanced E-UTRA may be used. In such an example, the cell may dynamically decide whether a V2X message can be transmitted using enhanced E-UTRA PC5. In such embodiments, this type of configuration may be supported if a cell can detect that UEs in its vicinity are enhanced E-UTRA PC5 capable (e.g., based on information from the UDM 410).

In various embodiments, the UE 402 may be configured so that for specific application IDs the UE 402 is E-UTRA PC5 authorized, and/or enhanced E-UTRA PC5 may be used in specific geographical locations. In such embodiments, if the UE 402 is triggered to transmit a V2X message for the specific application IDs, the UE 402 checks its geographical location to determine whether E-UTRA or enhanced E-UTRA is to be used.

In some embodiments, the UE 402 may be configured so that for a specific application ID, E-UTRA is authorized. In such embodiments, if the UE 402 is enhanced E-UTRA capable and if the UE 402 starts a message exchange (e.g., for unicast communications), the UE 402 may indicate that it is enhanced E-UTRA capable and may decide to use enhanced E-UTRA to convey a PC5 message.

In certain embodiments, the RAN 404 may not be able to know and/or gather enough information for the UE's 402 transmission configuration for a certain PC5 RAT. In such embodiments, the RAN 404 may know (e.g., by network configuration) which other RAN node to query to learn the PC5 configuration information. In some embodiments, a RAN node may broadcast or announce that it supports all types of PC5 communication. Moreover, some PC5 RATs may determine other RAN nodes' supported communications without a query to the other RAN nodes and for other PC5 RATs the PC5 RATs may need to query other RAN nodes to determine the other RAN nodes; supported communications. For example, a gNB may be able to configure the UE 402 for NR PC5 transmission, but may not be able to determine the E-UTRA PC5 or enhance E-UTRA PC5 configuration by itself. However, the gNB may know which particular eNB to query to obtain such E-UTRA PC5 or enhance E-UTRA PC5 configuration. Moreover, the gNB may announce support of E-UTRA PC5, enhance E-UTRA PC5, and NR PC5 communication.

Figure 5:
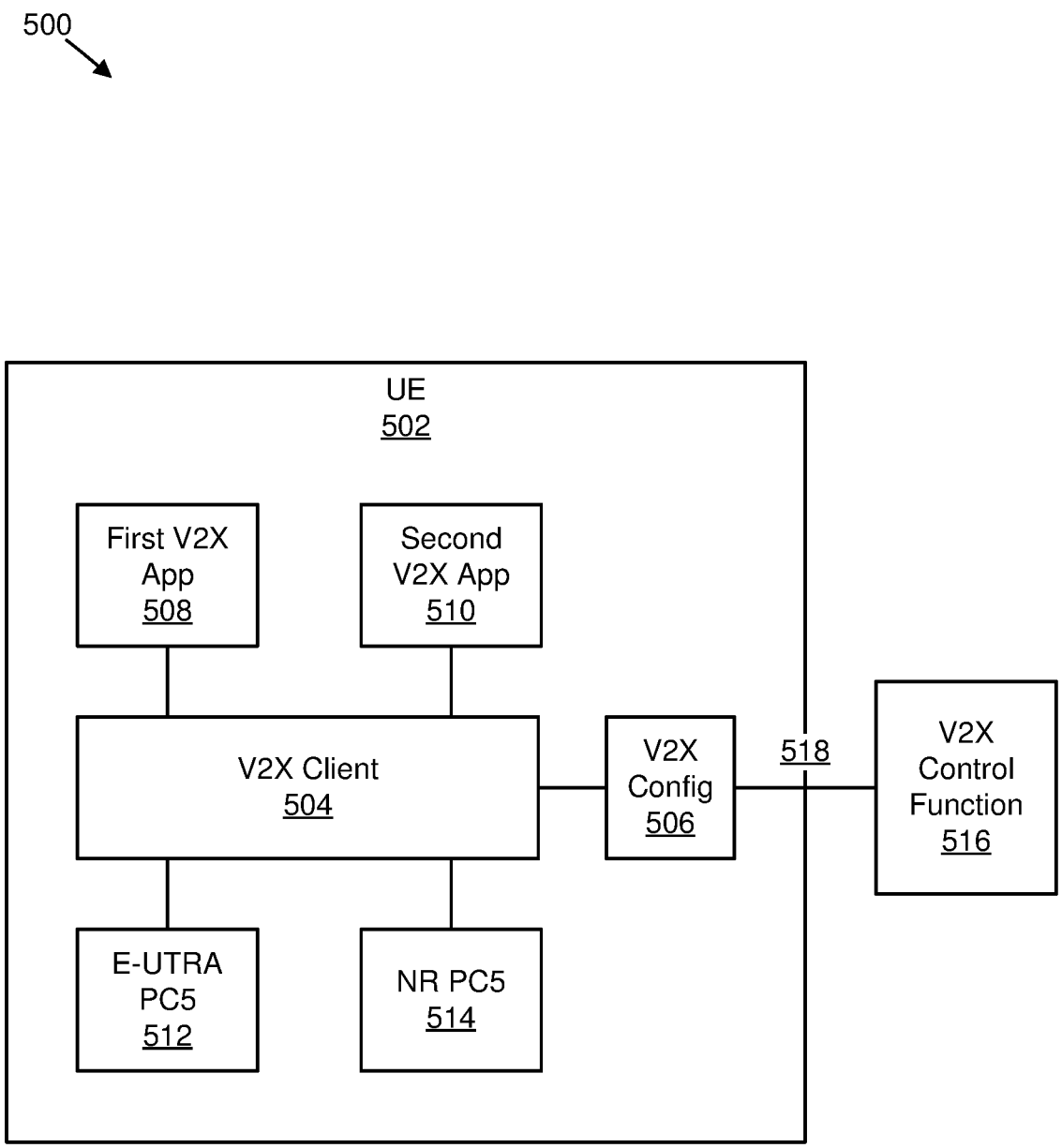
FIG. 5 is a schematic block diagram illustrating one embodiment of a system for sending a PC5 message over multiple RATs in an autonomous mode.

FIG. 5 is a schematic block diagram illustrating one embodiment of a system 500 for sending a PC5 message over multiple RATs in an autonomous mode. The system 500 includes a UE 502. The UE 502 may be substantially similar to the UE 402 and/or the remote unit 102 as described herein. Moreover, the UE 502 includes a V2X client 504 and has a V2X configuration 506 (V2X config). The V2X configuration 506 may include an E-UTRA PC5 radio configuration, an NR PC5 radio configuration, a list of application IDs for E-UTRA PC5, and/or a list of application IDS for NR PC5.

The UE 502 also includes a first V2X application 508 (first V2X app) and a second V2X application 510 (second V2X app). The UE 502 may be configured for E-UTRA PC5 512 and/or NR PC5 514. As illustrated, the system 500 also includes a V2X control function 516. In various embodiments, the V2X control function 516 may transmit information 518 indicating the V2X configuration 506.

In various embodiments, while the UE 502 is in an autonomous mode of operation, the UE 502 may determine a radio configuration for V2X services based on configuration policies of the V2X configuration 506. In one embodiment, the UE 502 determines the radio parameters to use based on a geographical area. In some embodiments, if the radio configuration indicates both NR PC5 and E-UTRA PC5, the UE 502 uses both radio parameters to listen for PC5 messages.

In certain embodiments, while the UE 502 is in an autonomous mode of operation and a V2X application requests to transmit a PC5 message, the UE 502 may determine whether the V2X message is to be sent over NR PC5 or E-UTRA PC5 based on the configuration received from the V2X control function 516. For example, while a V2X application may send a PC5 message over a V2X layer the UE 502 may determine based on a V2X application ID that the PC5 message must be sent over E-UTRA PC5 based on radio configuration parameters.

Figure 6:
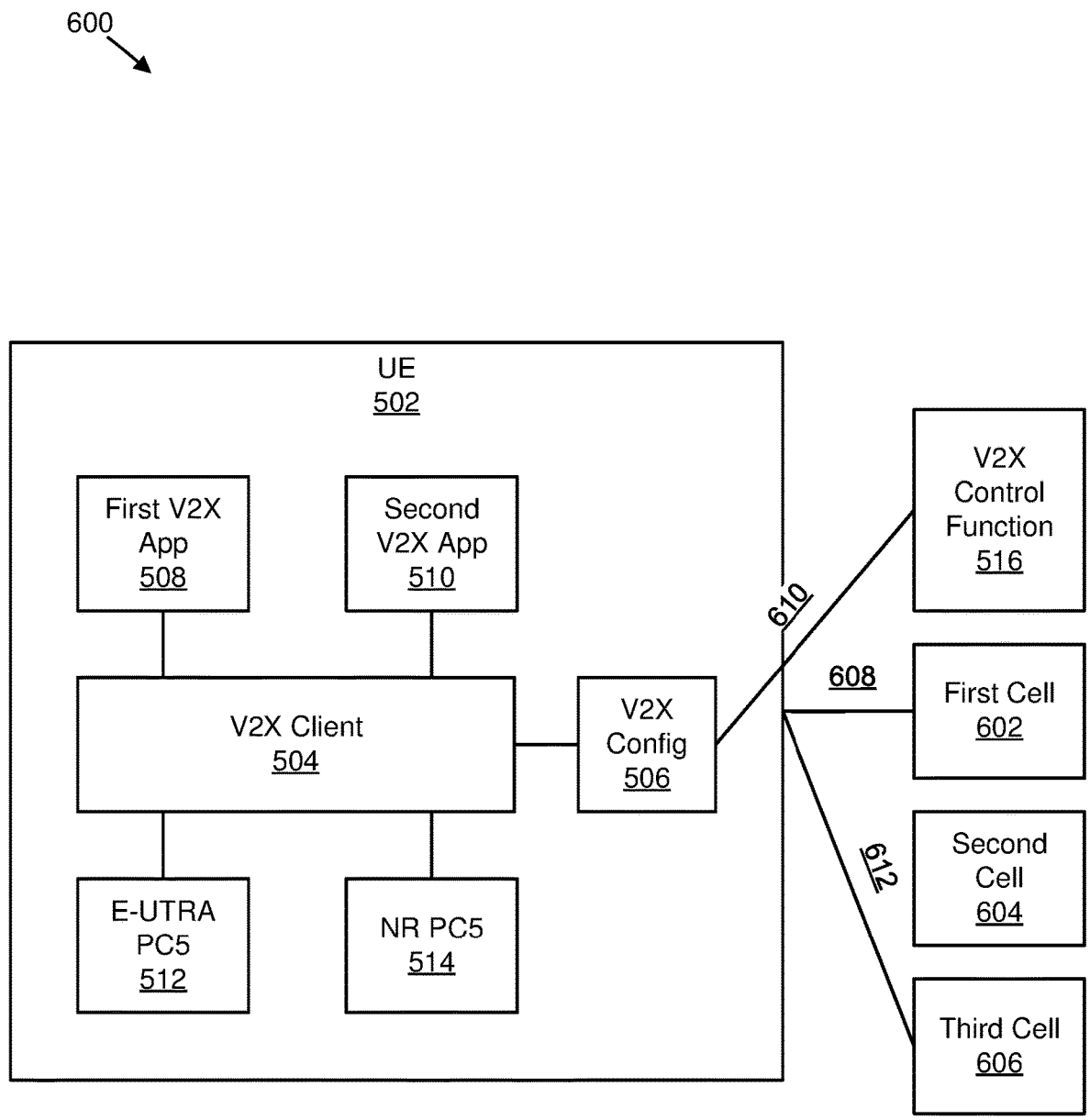
FIG. 6 is a schematic block diagram illustrating one embodiment of a system for sending a PC5 message over multiple RATs in a scheduled mode.

FIG. 6 is a schematic block diagram illustrating one embodiment of a system 600 for sending a PC5 message over multiple RATs in a scheduled mode. The system 600 includes the UE 502 and the V2X control function 516 which are substantially the same as the UE 502 and the V2X control function 516 of system 500. The system 600 also includes a first cell 602 (e.g., cell 1, cell having a first PLMN ID–ID=1, cell supporting NR PC5 radio frequencies), a second cell 604 (e.g., cell 2, cell having a PLMN ID–ID=1, cell supporting E-UTRA PC5 radio frequencies), and a third cell 606 (e.g., cell 3, cell having a second PLMN ID=ID=2, cell supporting NR PC5 and E-UTRA PC5 radio frequencies).

In some embodiments, the UE 502 may be camped out on the first cell 602. Moreover, in various embodiments, the V2X control function 516 may transmit information 610 indicating the V2X configuration 506. In one embodiment, the V2X configuration 506 may indicate that the first V2X application 508 has an ID=1 and that the first V2X application 508 is configured for NR PC5. Moreover, in such an embodiment, the V2X configuration 506 may indicate that the second V2X application 510 has an ID=2 and that the second V2X application 510 is configured for E-UTRA PC5. In certain embodiments, the UE 502 may determine that the second V2X application 510 requires E-UTRA PC5 and the UE 502 may be aware that the first V2X application 508 requires NR PC5. The first cell 602 may not support E-UTRA PC5 so the UE 502 may search for a cell supporting E-UTRA PC5. The second cell 604 may support E-UTRA PC5, but only E-UTRA PC5 is supported over Uu while the third cell 606 supports E-UTRA PC5 and NR PC5 over Uu. Accordingly, the UE 502 may select 612 the third cell 606 to transmit a V2X message of the second V2X application 510 because the third cell 606 also supports PC5 communications for the first V2X application 508.

In various embodiments, while in a scheduled mode of operation, if the UE 502 intends to use radio resources for V2X communication over PC5 the UE 502 may act as described in one or more of the following embodiments.

In certain embodiments, if the UE 502 is in an RRC_IDLE state: if a V2X application triggers the V2X layer to send a PC5 message over PC5, the UE 502 determines based on a V2X app ID to PC5 RAT whether the PC5 message is sent over E-UTRA or NR; the UE 502 then checks whether the serving cell has the radio resources available to support E-UTRA and/or NR PC5 (e.g., by checking the SIB information); if performing a cell search the UE 502 checks whether there are existing V2X communications that require NR and/or E-UTRA over PC5. For example, if there are existing applications that use NR and E-UTRA PC5, the UE 502 may search for a cell that supports both. If only E-UTRA PC5 is active, then the UE 502 may give priority to an E-UTRA cell. If only NR PC5 is active, then the UE 502 may give priority to an NR cell, and so forth.

In some embodiments, if a cell supports requested radio resources, the UE 502 may enter an RRC_CONNECTED state and request resource allocation to send a PC5 message. In various embodiments, if a cell does not support requested radio resources, the UE 502 may search for a cell in an existing PLMN that is operating the requested (e.g., provisioned) radio resources.

In certain embodiments, if the UE 502 does not find a cell in a registered PLMN, the UE 502 may check a cell in an equivalent PLMN in which authorization for V2X communications over a PC5 reference point is allowed. In some embodiments, if the UE 502 finds a cell in which authorization for V2X communications over a PC5 reference point is allowed but the UE 502 is not in the registered PLMN or a PLMN equivalent to the registered PLMN, and that cell belongs to a PLMN authorized for V2X communications over PC5 reference point and provides radio resources for V2X service, then the UE 502 may perform PLMN selection triggered by V2X communications over PC5 reference point as defined in TS 23.122.

In various embodiments, if the UE 502 finds a cell in which authorization for V2X communications over a PC5 reference point is allowed but the cell is not in a PLMN authorized for V2X communications over the PC5 reference point, the UE 502 may not use V2X communications over the PC5 reference point.

In certain embodiments, if the UE 502 does not find any suitable cell in any PLMN, then the UE 502 may consider itself not served by NG-RAN and use radio resources provisioned in a UE or a UICC. If no such provision exists in the ME or the UICC or the provision does not authorize V2X communications over a PC5 reference point, then the UE 502 is not authorized to transmit.

In some embodiments, the UE 502 may have existing V2X sessions active an over PC5 (e.g., NR PC5) and a V2X application ID may require to send a PC5 message over another PC5 interface (e.g., over E-UTRA PC5), but there may be no cell in the vicinity that supports both NR PC5 and E-UTRA PC5. In such embodiments, the UE 502 may have to drop the existing NR PC5 sessions in order to attach to a cell supporting E-UTRA PC5. However, if there are NR PC5 services that require constant communication, dropping the existing NR PC5 sessions may interrupt such services. Accordingly, the UE 502 may determine whether a V2X service is allowed to preempt other services.

In various embodiments, the UE 502 may receive configuration information with a list of V2X application IDs that may be preempted if a new V2X application requires a service that is not supported by the serving cell and/or PLMN. The list may also include information with V2X application IDs for which preemption is not allowed. In such embodiments, if a V2X application ID requests to send a PC5 message that is not supported in a current cell, the UE 502 may check whether the existing V2X application can be preempted.

In certain embodiments, a V2X application may indicate that a PC5 message is for an emergency (e.g., a car broadcasting an emergency braking alert). In such embodiments, the UE 502 may immediately preempt all other V2X services and search for a cell that supports a carrier frequency for the emergency. In one embodiment, the UE 502 may be configured with a specific V2X application ID that is mapped to an emergency PC5 message.

In some embodiments, the UE 502 may request a RAN node for a different PC5 RAT and a network (e.g., the RAN node and/or a core network) may initiate either idle mode mobility (e.g., RRC release with a redirection indication) or connected mode mobility to a RAN node that supports a PC5 RAT requested. For this purpose, the RAN node, at a location on which the UE 502 is currently camping, may announce to the UE 502 that multiple types of PC5 RATs are supported even though that RAN node will not support all PC5 RATs. In such embodiments, the RAN node may not support all the PC5 RAT types but may be configured with other RAN nodes in the vicinity of this node that support the requested PC5 RAT. Such a network-based solution may be referred to as a fallback for V2X service(s) over PC5 interface.

In various embodiments, if the UE 502 is in an RRC_IDLE mode, the UE 502 may request resources for PC5 transmission from a RAN by entering an RRC_CONNECTED state. In certain embodiments, if the RAN node does not support a requested PC5 RAT, the RAN node may send an RRC release message including a redirect indication that contains a list of target cells that support the requested PC5 RAT. In such embodiments, the UE 502 may carry an idle mode mobility procedure to attach to a new cell and request resources for PC5 transmission.

In certain embodiments, if the UE 502 is in an ECM and/or RRC CONNECTED mode, a RAN node may initiate a handover by sending a handover request towards an MME and/or an AMF. In some embodiments, in a handover request, a RAN node may include an indication for a PC5 RAT requested. In various embodiments, an MME and/or an AMF may identify a target RAN node that supports requested PC5 and may initiate a handover command towards a RAN node that supports the requested PC5 RAT. In certain embodiments, a source RAN node may include, in a handover required message, a target cell ID that supports a requested PC5 RAT.

In some embodiments, if the UE 502 is in an RRC_CONNECTED mode and a source RAN node is configured target RAN nodes supporting certain PC5 RATs, the source RAN node may initiate a handover by sending a handover request towards a target RAN node (e.g., via an X2 or an Xn interface).

As may be appreciated, V2X applications may tolerate a small delay before a radio transmission is possible (e.g., 20-50 ms delay). Such a delay may result from a mobility procedure (e.g., idle mode or connected mode mobility). In certain embodiments, a RAN node may announce to the UE 502 which of supported PC5 RATs are associated with a certain small delay. In such embodiments, the UE 502 may be able to assess whether an application request for transmission over a different PC5 RAT 1) has a higher priority (e.g., to pre-empt current PC5 RAT) and/or 2) the application can tolerate a certain small delay for cell change. In some embodiments, an autonomous (e.g., UE-based) change of cell performed by the UE 502 may have a larger delay than a network-based solution because the UE 502 may need to scan and tune to cells supporting a different PC5 RAT.

Figure 7:
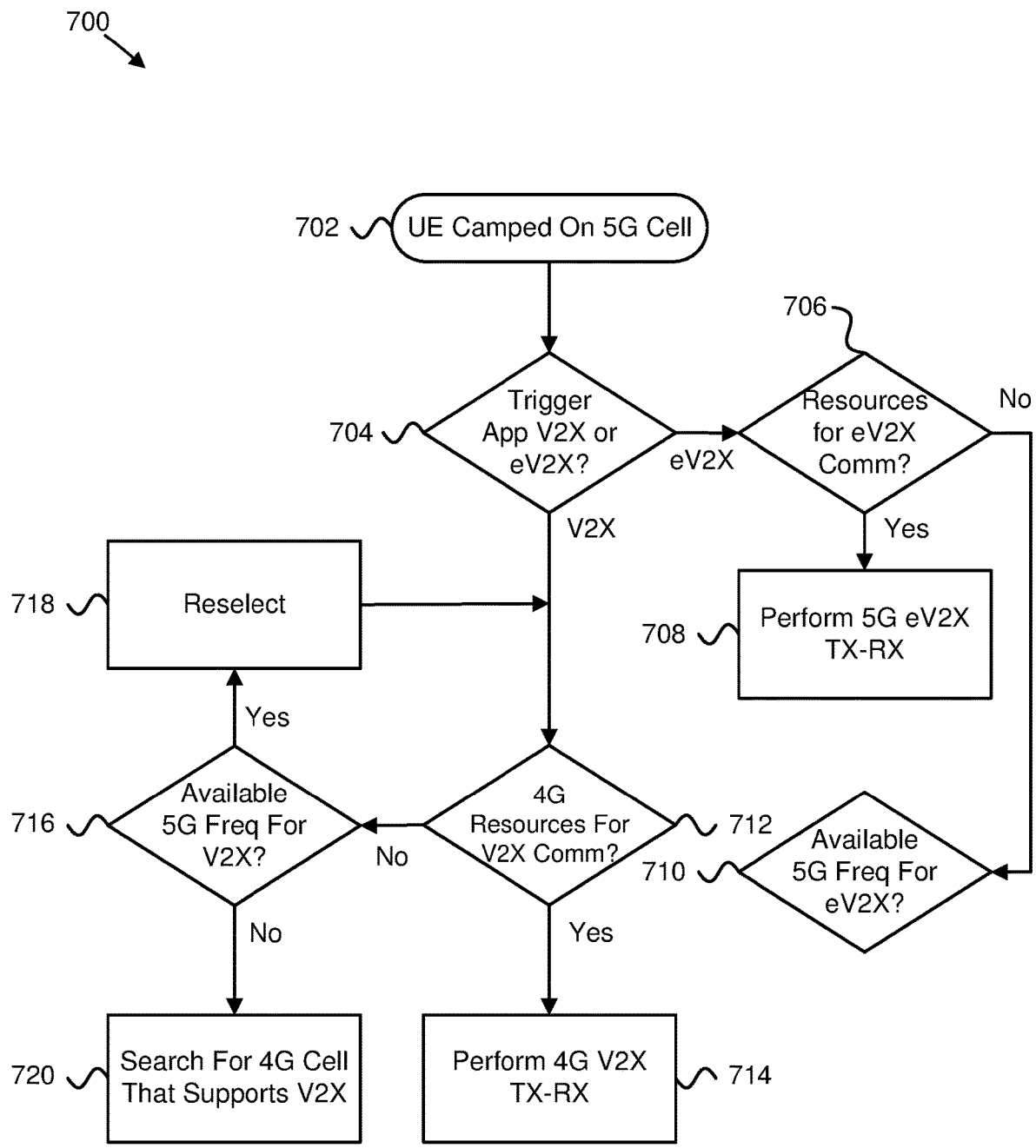
FIG. 7 is a flow chart diagram illustrating one embodiment of a method for a UE selecting a cell while the UE is camped in a 5G cell.

FIG. 7 is a flow chart diagram illustrating one embodiment of a method 700 for a UE selecting a cell while the UE is camped in a 5G cell. The method 700 includes a UE camped 702 on a 5G cell. The method 700 includes determining 704 whether a V2X application or an eV2X application is triggered. If an eV2X application is triggered, the method 700 may determine 706 whether the 5G cell provides resources for eV2X communication. If the 5G cell provides resources for eV2X communication, the method 700 may perform 708 5G eV2X TX-RX. If the 5G cell does not provide resources for eV2X communication, the method 700 may determine 710 whether there are other 5G frequencies available for supporting eV2X. If there are other 5G frequencies available, 5G eV2X TX-RX may be performed on another 5G frequency.

If a V2X application is triggered, the method 700 may determine 712 whether the 5G cell provides resources for V2X communication over 4G resources. If the 5G cell provides resources for V2X communication over 4G resources, the method 700 may perform 714 4G V2X TX-RX. If the 5G cell does not provide resources for V2X communication over 4G resources, the method 700 may determine 716 whether other 5G frequencies supporting V2X communications are available. If other 5G frequencies supporting V2X communications are available, the method 700 may reselect 718 another 5G frequency and the method 700 may return to determining 712 whether the 5G cell provides resources for V2X communication over 4G resources. If other 5G frequencies supporting V2X communications are not available, the method 700 may search 720 for a 4G cell that supports V2X, and the method 700 may end.

Figure 8:
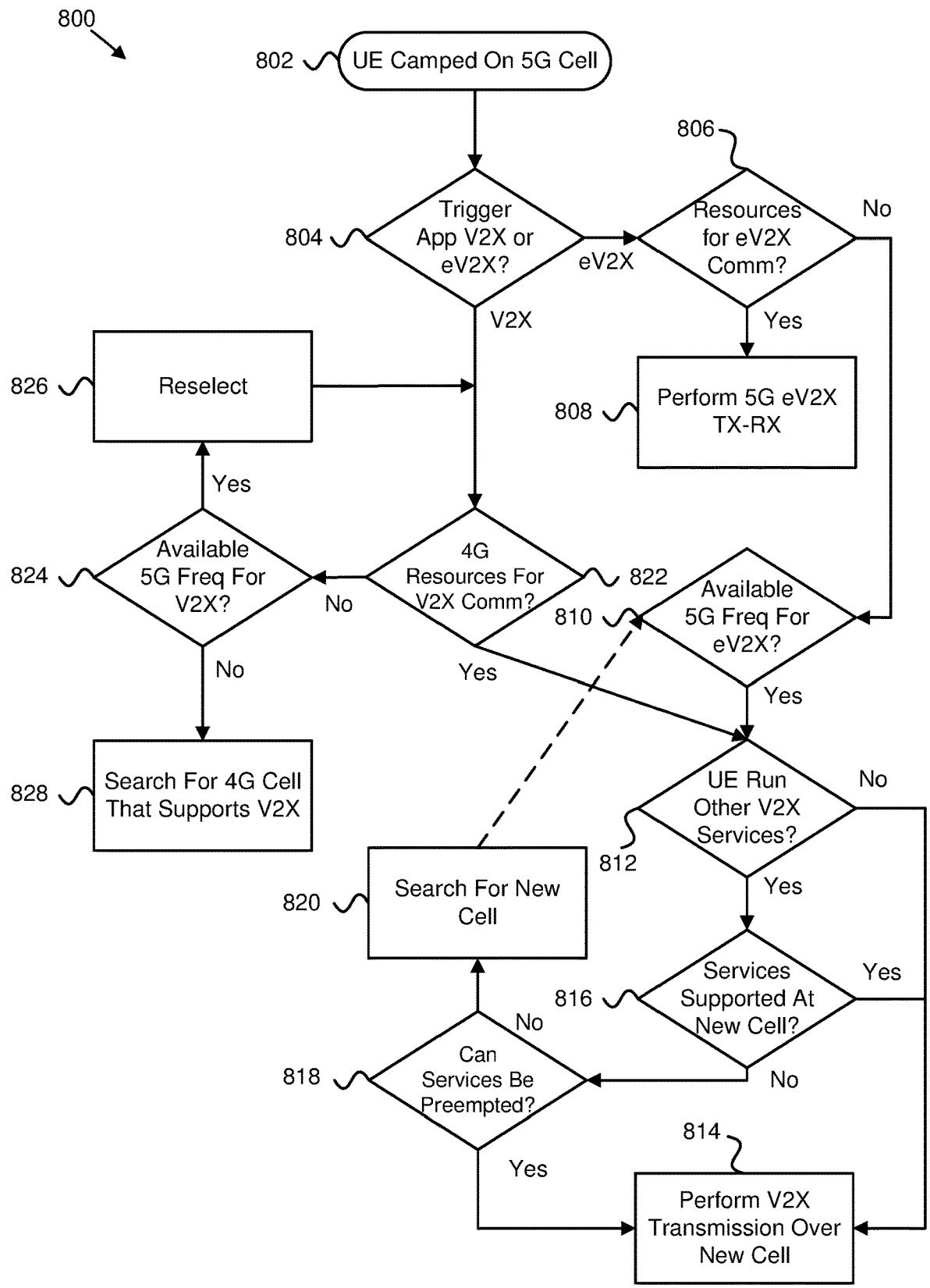
FIG. 8 is a flow chart diagram illustrating another embodiment of a method for a UE selecting a cell while the UE is camped in a 5G cell.

FIG. 8 is a flow chart diagram illustrating another embodiment of a method 800 for a UE selecting a cell while the UE is camped in a 5G cell. The method 800 includes a UE camped 802 on a 5G cell. The method 800 includes determining 804 whether a V2X application or an eV2X application is triggered. If an eV2X application is triggered, the method 800 may determine 806 whether the 5G cell provides resources for eV2X communication. If the 5G cell provides resources for eV2X communication, the method 800 may perform 808 5G eV2X TX-RX. If the 5G cell does not provide resources for eV2X communication, the method 800 may determine 810 whether there are other 5G frequencies available for supporting eV2X.

If there are other 5G frequencies available for supporting eV2X, the method 800 may determine 812 whether the UE runs other V2X services. If the UE does not run other V2X services, the method 800 may perform 814 V2X transmission over a new cell. If the UE does run other V2X services, the method 800 may determine 816 whether the other V2X services are supported at a new cell. If the other V2X services are supported at the new cell, the method 800 may perform 814 V2X transmission over the new cell. If the other V2X services are not supported at the new cell, the method 800 may determine 818 whether the other V2X services can be preempted. If the other V2X services can be preempted, the method 800 may perform 814 V2X transmission over the new cell. If the other V2X services cannot be preempted, the method 800 may search 820 for a new cell and return to determining 810 whether there are other 5G frequencies available for supporting eV2X.

If a V2X application is triggered, the method 800 may determine 822 whether the 5G cell provides resources for V2X communication over 4G resources. If the 5G cell provides resources for V2X communication over 4G resources, the method 800 may determine 812 whether the UE runs other V2X services. The method 800 may then proceed through steps 812 through 820 as discussed herein. If the method 800 searches 820 for a new cell, the method 800 may end.

If the 5G cell does not provide resources for V2X communication over 4G resources, the method 800 may determine 824 whether other 5G frequencies supporting V2X communications are available. If other 5G frequencies supporting V2X communications are available, the method 800 may reselect 826 another 5G frequency and the method 800 may return to determining 822 whether the 5G cell provides resources for V2X communication over 4G resources. If other 5G frequencies supporting V2X communications are not available, the method 800 may search 828 for a 4G cell that supports V2X, and the method 800 may end.

Figure 9:
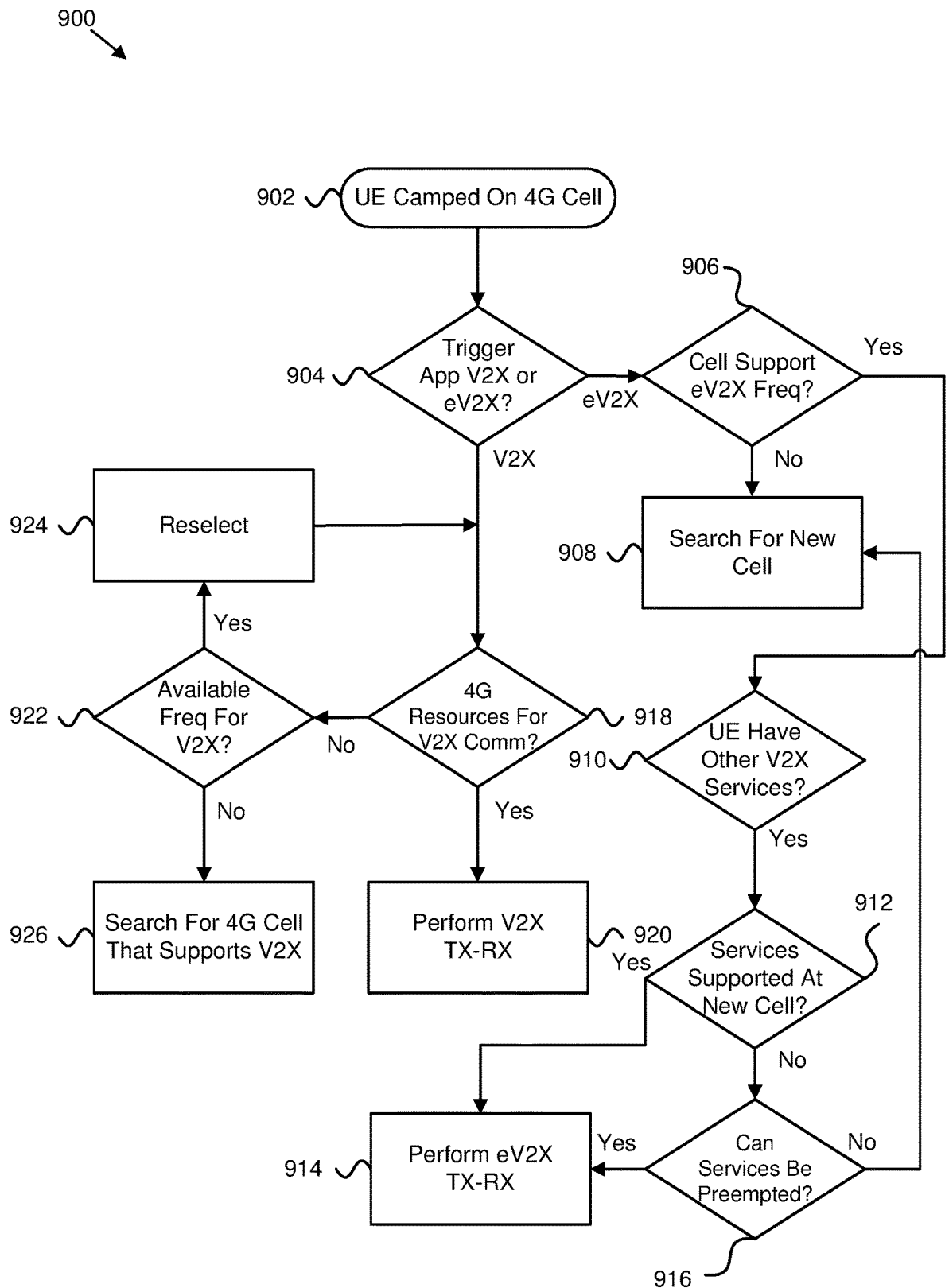
FIG. 9 is a flow chart diagram illustrating one embodiment of a method for a UE selecting a cell while the UE is camped in a 4G cell.

FIG. 9 is a flow chart diagram illustrating one embodiment of a method 900 for a UE selecting a cell while the UE is camped in a 4G cell. The method 900 includes a UE camped 902 on a 4G cell. The method 900 includes determining 904 whether a V2X application or an eV2X application is triggered. If an eV2X application is triggered, the method 900 may determine 906 whether the 4G cell supports eV2X frequencies. If the 4G cell does not support eV2X frequencies, the method 900 may search 908 for a new cell. If the 4G cell does support V2X frequencies, the method 900 may determine 910 whether the UE has other V2X services. If the UE has other V2X services, the method 900 may determine 912 whether the other V2X services are supported at a new cell. If the other V2X services are supported at the new cell, the method 900 may perform 914 eV2X TX-RX. If the other V2X services are not supported at the new cell, the method 900 may determine 916 whether the other V2X services can be preempted. If the other V2X services can be preempted, the method 800 may perform 914 eV2X TX-RX. If the other V2X services cannot be preempted, the method 900 may search 908 for a new cell.

If a V2X application is triggered, the method 900 may determine 918 whether the 4G cell provides resources for V2X communication over 4G resources. If the 4G cell provides resources for V2X communication over 4G resources, the method 900 may perform 920 V2X TX-RX. If the 4G cell does not provide resources for V2X communication over 4G resources, the method 900 may determine 922 whether other 4G frequencies supporting V2X communications are available. If other 4G frequencies supporting V2X communications are available, the method 900 may reselect 924 another 4G frequency and the method 900 may return to determining 918 whether the 4G cell provides resources for V2X communication over 4G resources. If other 4G frequencies supporting V2X communications are not available, the method 900 may search 926 for a 4G cell that supports V2X, and the method 900 may end.

Figure 10:
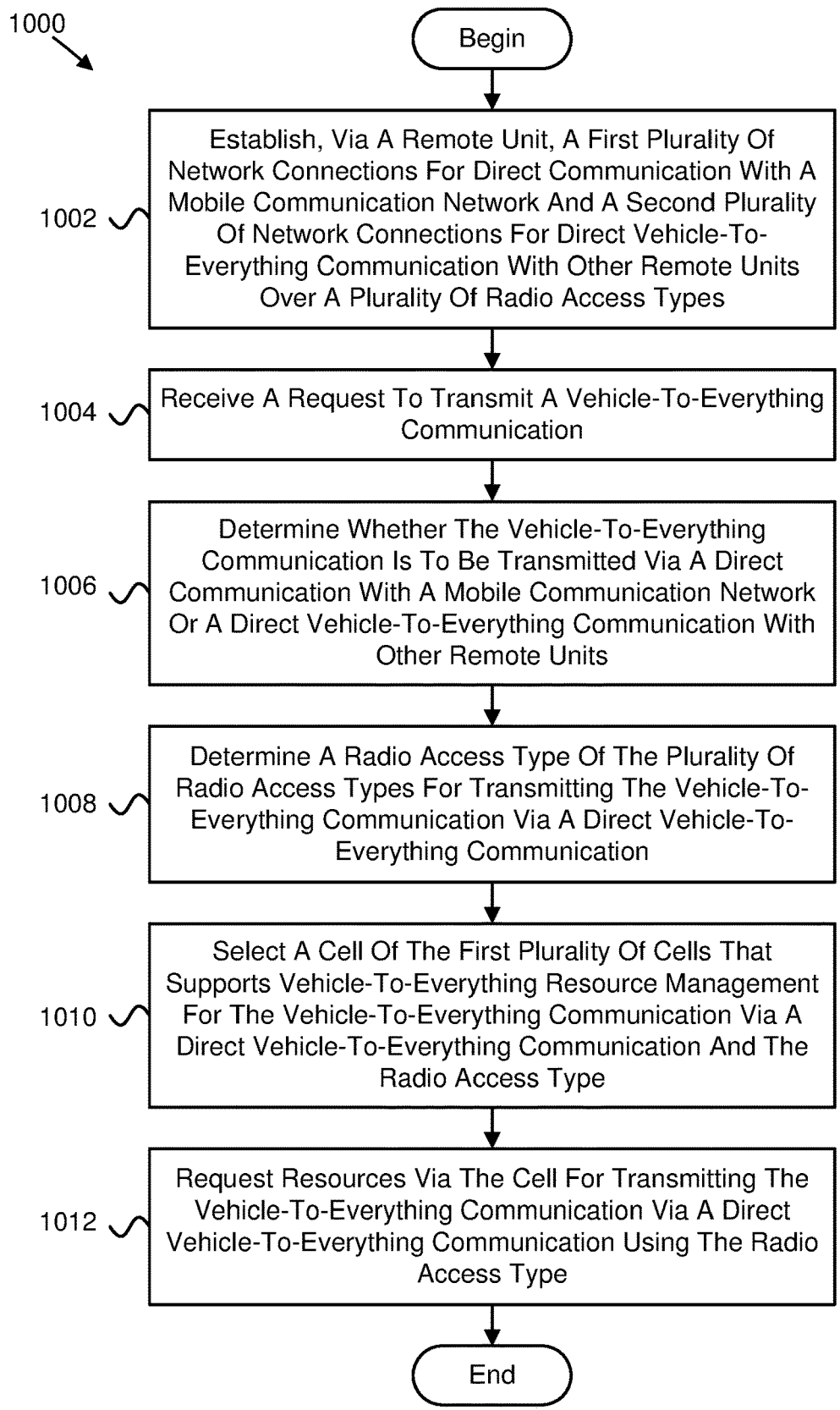
FIG. 10 is a flow chart diagram illustrating one embodiment of a method for V2X communication over multiple radio access types.

FIG. 10 is a flow chart diagram illustrating one embodiment of a method 1000 for V2X communication over multiple radio access types. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include establishing 1002, via a remote unit 102, a first plurality of network connections for direct communication with a mobile communication network and a second plurality of network connections for direct vehicle-to-everything communication with other remote units over a plurality of radio access types. In certain embodiments, the method 1000 includes receiving 1004 a request to transmit a vehicle-to-everything communication. In various embodiments, the method 1000 includes determining 1006 whether the vehicle-to-everything communication is to be transmitted via a direct communication with a mobile communication network or a direct vehicle-to-everything communication with other remote units 102. In some embodiments, the method 1000 includes determining 1008 a radio access type of the plurality of radio access types for transmitting the vehicle-to-everything communication via a direct vehicle-to-everything communication. In certain embodiments, the method 1000 includes selecting 1010 a cell of a plurality of cells that supports vehicle-to-everything resource management for the vehicle-to-everything communication via a direct vehicle-to-everything communication and the radio access type. In various embodiments, the method 1000 includes requesting 1012 resources via the cell for transmitting the vehicle-to-everything communication via a direct vehicle-to-everything communication using the radio access type.

In certain embodiments, the plurality of radio access types comprises evolved universal terrestrial radio access, new radio, or a combination thereof. In some embodiments, the method 1000 further comprises supporting a plurality of vehicle-to-everything applications, wherein each vehicle-to-everything application of the plurality of vehicle-to-everything applications uses a corresponding network connection of the second plurality of network connections for direct vehicle-to-everything communication with other remote units 102 over a corresponding radio access type of the plurality of radio access types.

In various embodiments, each vehicle-to-everything application of the plurality of vehicle-to-everything applications has a vehicle-to-everything application identifier. In one embodiment, the method 1000 further comprises determining the radio access type for transmitting a vehicle-to-everything communication via direct vehicle-to-everything communication based on a mapping of the vehicle-to-everything application identifier corresponding to a vehicle-to-everything application of the plurality of vehicle-to-everything applications to a specific radio access type.

In certain embodiments, the method 1000 further comprises determining the preemption of a first vehicle-to-everything application of the plurality of vehicle-to-everything applications based on a mapping of the vehicle-to-everything application identifier corresponding to the first vehicle-to-everything application to a preemption flag. In some embodiments, the method 1000 further comprises determining the cell that supports vehicle-to-everything resource management based on a vehicle-to-everything carrier frequency of the first vehicle-to-everything application of the plurality of vehicle-to-everything applications.

In various embodiments, the method 1000 further comprises determining whether the cell supports vehicle-to-everything resource management based on a vehicle-to-everything carrier frequency of a second vehicle-to-everything application of the plurality of vehicle-to-everything applications. In one embodiment, the method 1000 further comprises determining that a second vehicle-to-everything application of the plurality of vehicle-to-everything applications cannot be preempted and, in response to the cell not supporting vehicle-to-everything resource management based on the vehicle-to-everything carrier frequency of the second vehicle-to-everything application of the plurality of vehicle-to-everything applications, selecting a different cell of the plurality of cells that supports vehicle-to-everything resource management and the carrier frequency of the second vehicle-to-everything application.

Figure 11:
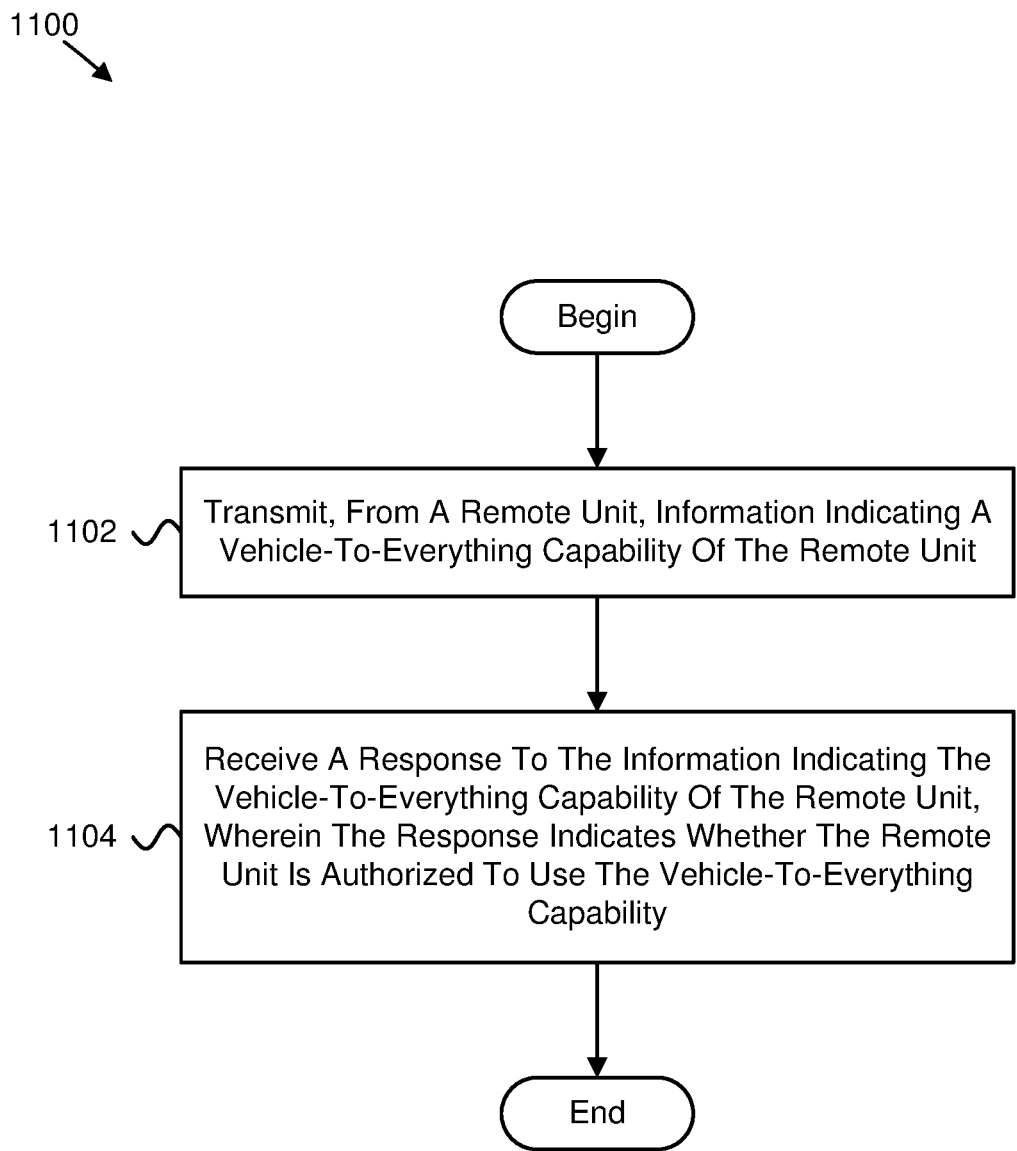
FIG. 11 is a flow chart diagram illustrating another embodiment of a method for V2X communication over multiple radio access types.

FIG. 11 is a flow chart diagram illustrating another embodiment of a method 1100 for V2X communication over multiple radio access types. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include transmitting 1102, from a remote unit 102, information indicating a vehicle-to-everything capability of the remote unit 102. In various embodiments, the method 1100 includes receiving 1104 a response to the information indicating the vehicle-to-everything capability of the remote unit 102. In such embodiments, the response indicates whether the remote unit 102 is authorized to use the vehicle-to-everything capability.

In certain embodiments, the information indicating the vehicle-to-everything capability of the remote unit 102 is transmitted during a registration procedure. In some embodiments, the information indicating the vehicle-to-everything capability of the remote unit 102 indicates whether vehicle-to-everything communication is supported. In various embodiments, the information indicating the vehicle-to-everything capability of the remote unit 102 indicates which vehicle-to-everything services are supported by the remote unit 102, and the vehicle-to-everything services comprise evolved universal terrestrial radio access, new radio, or a combination thereof.

In certain embodiments, a unified data management authorizes the remote unit 102 to use the vehicle-to-everything capability. In some embodiments, the unified data management indicates to an access and mobility management function which radio access types that the remote unit 102 is enabled to use.

In various embodiments, the radio access types comprise evolved universal terrestrial radio access and new radio. In one embodiment, the access and mobility management function indicates to a radio access network authorization to carry out resource management for direct vehicle-to-everything communication for the remote unit 102 for a new radio access type, an evolved universal terrestrial radio access type, or a combination thereof.

Figure 12:
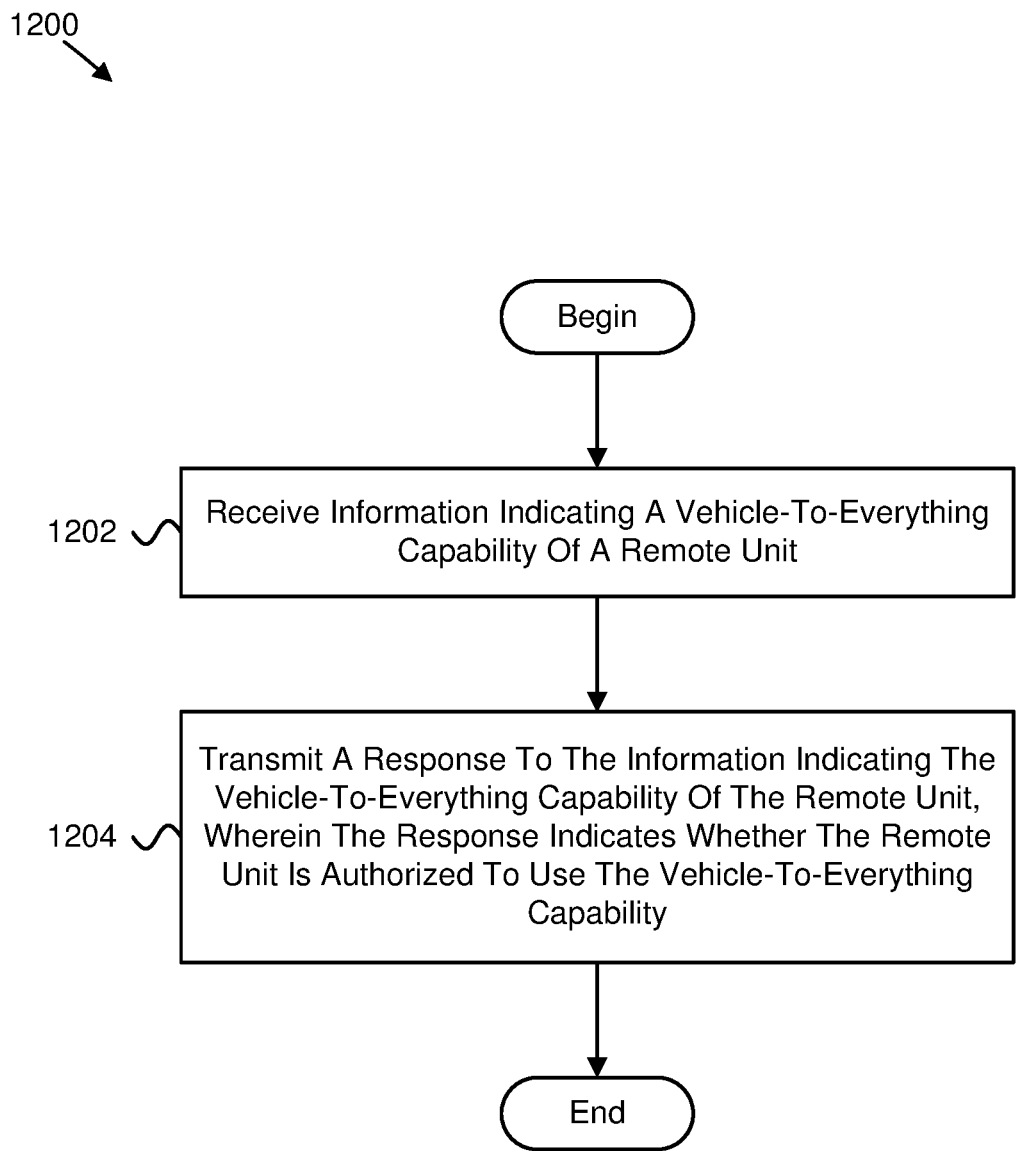
FIG. 12 is a flow chart diagram illustrating a further embodiment of a method for V2X communication over multiple radio access types.

FIG. 12 is a flow chart diagram illustrating a further embodiment of a method 1200 for V2X communication over multiple radio access types. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 information indicating a vehicle-to-everything capability of a remote unit 102. In various embodiments, the method 1200 includes transmitting 1204 a response to the information indicating the vehicle-to-everything capability of the remote unit 102. In such embodiments, the response indicates whether the remote unit 102 is authorized to use the vehicle-to-everything capability.

In certain embodiments, the information indicating the vehicle-to-everything capability of the remote unit 102 is transmitted during a registration procedure. In some embodiments, the information indicating the vehicle-to-everything capability of the remote unit 102 indicates whether vehicle-to-everything communication is supported. In various embodiments, the information indicating the vehicle-to-everything capability of the remote unit indicates which vehicle-to-everything services are supported by the remote unit 102, and the vehicle-to-everything services comprise evolved universal terrestrial radio access, new radio, or a combination thereof.

In certain embodiments, a unified data management authorizes the remote unit 102 to use the vehicle-to-everything capability. In some embodiments, the unified data management indicates to an access and mobility management function which radio access types that the remote unit 102 is enabled to use.

In various embodiments, the radio access types comprise evolved universal terrestrial radio access and new radio. In one embodiment, the access and mobility management function indicates to a radio access network authorization to carry out resource management for direct vehicle-to-everything communication for the remote unit 102 for a new radio access type, an evolved universal terrestrial radio access type, or a combination thereof.

Figure 13:
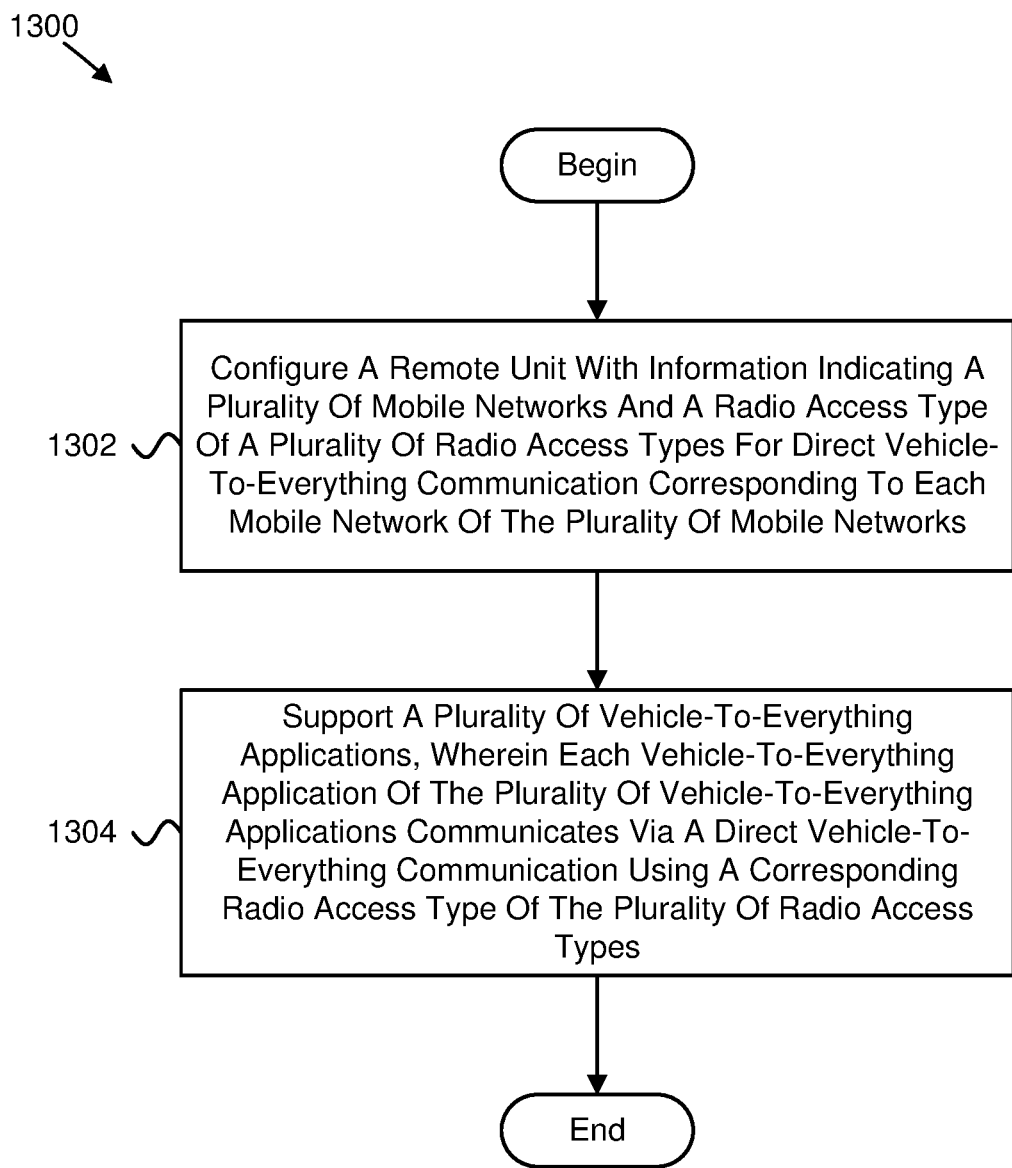
FIG. 13 is a flow chart diagram illustrating yet another embodiment of a method for V2X communication over multiple radio access types.

FIG. 13 is a flow chart diagram illustrating yet another embodiment of a method 1300 for V2X communication over multiple radio access types. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include configuring 1302 a remote unit 102 with information indicating a plurality of mobile networks and a radio access type of a plurality of radio access types for direct vehicle-to-everything communication corresponding to each mobile network of the plurality of mobile networks. In various embodiments, the method 1300 includes supporting 1304 a plurality of vehicle-to-everything applications. In such embodiments, each vehicle-to-everything application of the plurality of vehicle-to-everything applications communicates via a direct vehicle-to-everything communication using a corresponding radio access type of the plurality of radio access types.

In certain embodiments, the plurality of radio access types comprises evolved universal terrestrial radio access, enhanced evolved universal terrestrial radio access, new radio, or some combination thereof. In some embodiments, the method 1300 further comprises configuring the remote unit 102 with information indicating geographic areas for communication, wherein each geographic area of the geographic areas has a corresponding radio access type of the plurality of radio access types. In various embodiments, the method 1300 further comprises receiving a trigger, from a vehicle-to-everything application of the plurality of vehicle-to-everything applications, to send a message via a vehicle-to-everything communication.

In one embodiment, the method 1300 further comprises selecting to send a message via a direct vehicle-to-everything communication and determining a radio access type of the plurality of radio access types for transmitting the message via the direct vehicle-to-everything communication. In certain embodiments, in an autonomous mode, the remote unit 102 determines the message radio access type based on configuration information received from a vehicle-to-everything control function. In some embodiments, the message comprises a priority.

In various embodiments, the method 1300 further comprises determining a transmission radio access type of the plurality of radio access types for transmitting the message based on the priority. In one embodiment, the method 1300 further comprises configuring the remote unit 102 with a mapping between the priority and at least one radio access type of the plurality of radio access types. In certain embodiments, the transmission radio access type of the plurality of radio access types for transmitting the message is determined based on the mapping.

In some embodiments, the method 1300 further comprises configuring the remote unit 102 with a mapping between application identifiers corresponding to the plurality of vehicle-to-everything applications and at least one radio access type of the plurality of radio access types.

In one embodiment, a method comprises: establishing, via a remote unit, a first plurality of network connections for direct communication with a mobile communication network and a second plurality of network connections for direct vehicle-to-everything communication with other remote units over a plurality of radio access types; receiving a request to transmit a vehicle-to-everything communication; determining whether the vehicle-to-everything communication is to be transmitted via a direct communication with a mobile communication network or a direct vehicle-to-everything communication with other remote units; determining a radio access type of the plurality of radio access types for transmitting the vehicle-to-everything communication via a direct vehicle-to-everything communication; selecting a cell of a plurality of cells that supports vehicle-to-everything resource management for the vehicle-to-everything communication via a direct vehicle-to-everything communication and the radio access type; and requesting resources via the cell for transmitting the vehicle-to-everything communication via a direct vehicle-to-everything communication using the radio access type.

In certain embodiments, the plurality of radio access types comprises evolved universal terrestrial radio access, new radio, or a combination thereof.

In some embodiments, the method further comprises supporting a plurality of vehicle-to-everything applications, wherein each vehicle-to-everything application of the plurality of vehicle-to-everything applications uses a corresponding network connection of the second plurality of network connections for direct vehicle-to-everything communication with other remote units over a corresponding radio access type of the plurality of radio access types.

In various embodiments, each vehicle-to-everything application of the plurality of vehicle-to-everything applications has a vehicle-to-everything application identifier.

In one embodiment, the method further comprises determining the radio access type for transmitting a vehicle-to-everything communication via direct vehicle-to-everything communication based on a mapping of the vehicle-to-everything application identifier corresponding to a vehicle-to-everything application of the plurality of vehicle-to-everything applications to a specific radio access type.

In certain embodiments, the method further comprises determining the preemption of a first vehicle-to-everything application of the plurality of vehicle-to-everything applications based on a mapping of the vehicle-to-everything application identifier corresponding to the first vehicle-to-everything application to a preemption flag.

In some embodiments, the method further comprises determining the cell that supports vehicle-to-everything resource management based on a vehicle-to-everything carrier frequency of the first vehicle-to-everything application of the plurality of vehicle-to-everything applications.

In various embodiments, the method further comprises determining whether the cell supports vehicle-to-everything resource management based on a vehicle-to-everything carrier frequency of a second vehicle-to-everything application of the plurality of vehicle-to-everything applications.

In one embodiment, the method further comprises determining that a second vehicle-to-everything application of the plurality of vehicle-to-everything applications cannot be preempted and, in response to the cell not supporting vehicle-to-everything resource management based on the vehicle-to-everything carrier frequency of the second vehicle-to-everything application of the plurality of vehicle-to-everything applications, selecting a different cell of the plurality of cells that supports vehicle-to-everything resource management and the carrier frequency of the second vehicle-to-everything application.

In one embodiment, an apparatus comprises: a processor that: establishes a first plurality of network connections for direct communication with a mobile communication network and a second plurality of network connections for direct vehicle-to-everything communication with other remote units over a plurality of radio access types; receives a request to transmit a vehicle-to-everything communication; determines whether the vehicle-to-everything communication is to be transmitted via a direct communication with a mobile communication network or a direct vehicle-to-everything communication with other remote units; determines a radio access type of the plurality of radio access types for transmitting the vehicle-to-everything communication via a direct vehicle-to-everything communication; selects a cell of a plurality of cells that supports vehicle-to-everything resource management for the vehicle-to-everything communication via a direct vehicle-to-everything communication and the radio access type; and requests resources via the cell for transmitting the vehicle-to-everything communication via a direct vehicle-to-everything communication using the radio access type.

In certain embodiments, the plurality of radio access types comprises evolved universal terrestrial radio access, new radio, or a combination thereof.

In some embodiments, the processor supports a plurality of vehicle-to-everything applications, and each vehicle-to-everything application of the plurality of vehicle-to-everything applications uses a corresponding network connection of the second plurality of network connections for direct vehicle-to-everything communication with other remote units over a corresponding radio access type of the plurality of radio access types.

In various embodiments, each vehicle-to-everything application of the plurality of vehicle-to-everything applications has a vehicle-to-everything application identifier.

In one embodiment, the processor determines the radio access type for transmitting a vehicle-to-everything communication via direct vehicle-to-everything communication based on a mapping of the vehicle-to-everything application identifier corresponding to a vehicle-to-everything application of the plurality of vehicle-to-everything applications to a specific radio access type.

In certain embodiments, the processor determines the preemption of a first vehicle-to-everything application of the plurality of vehicle-to-everything applications based on a mapping of the vehicle-to-everything application identifier corresponding to the first vehicle-to-everything application to a preemption flag.

In some embodiments, the processor determines the cell that supports vehicle-to-everything resource management based on a vehicle-to-everything carrier frequency of the first vehicle-to-everything application of the plurality of vehicle-to-everything applications.

In various embodiments, the processor determines whether the cell supports vehicle-to-everything resource management based on a vehicle-to-everything carrier frequency of a second vehicle-to-everything application of the plurality of vehicle-to-everything applications.

In one embodiment, the processor determines that a second vehicle-to-everything application of the plurality of vehicle-to-everything applications cannot be preempted and, in response to the cell not supporting vehicle-to-everything resource management based on the vehicle-to-everything carrier frequency of the second vehicle-to-everything application of the plurality of vehicle-to-everything applications, selects a different cell of the plurality of cells that supports vehicle-to-everything resource management and the carrier frequency of the second vehicle-to-everything application.

In one embodiment, a method comprises: transmitting, from a remote unit, information indicating a vehicle-to-everything capability of the remote unit; and receiving a response to the information indicating the vehicle-to-everything capability of the remote unit, wherein the response indicates whether the remote unit is authorized to use the vehicle-to-everything capability.

In certain embodiments, the information indicating the vehicle-to-everything capability of the remote unit is transmitted during a registration procedure.

In some embodiments, the information indicating the vehicle-to-everything capability of the remote unit indicates whether vehicle-to-everything communication is supported.

In various embodiments, the information indicating the vehicle-to-everything capability of the remote unit indicates which vehicle-to-everything services are supported by the remote unit, and the vehicle-to-everything services comprise evolved universal terrestrial radio access, new radio, or a combination thereof.

In certain embodiments, a unified data management authorizes the remote unit to use the vehicle-to-everything capability.

In some embodiments, the unified data management indicates to an access and mobility management function which radio access types that the remote unit is enabled to use.

In various embodiments, the radio access types comprise evolved universal terrestrial radio access, new radio, or a combination thereof.

In one embodiment, the access and mobility management function indicates to a radio access network authorization to carry out resource management for direct vehicle-to-everything communication for the remote unit for a new radio access type, an evolved universal terrestrial radio access type, or a combination thereof.

In one embodiment, an apparatus comprises: a transmitter that transmits information indicating a vehicle-to-everything capability of the apparatus; and a receiver that receives a response to the information indicating the vehicle-to-everything capability of the apparatus, wherein the response indicates whether the apparatus is authorized to use the vehicle-to-everything capability.

In certain embodiments, the information indicating the vehicle-to-everything capability of the apparatus is transmitted during a registration procedure.

In some embodiments, the information indicating the vehicle-to-everything capability of the apparatus indicates whether vehicle-to-everything communication is supported.

In various embodiments, the information indicating the vehicle-to-everything capability of the apparatus indicates which vehicle-to-everything services are supported by the apparatus, and the vehicle-to-everything services comprise evolved universal terrestrial radio access, new radio, or a combination thereof.

In certain embodiments, a unified data management authorizes the apparatus to use the vehicle-to-everything capability.

In some embodiments, the unified data management indicates to an access and mobility management function which radio access types that the apparatus is enabled to use.

In various embodiments, the radio access types comprise evolved universal terrestrial radio access, new radio, or a combination thereof.

In one embodiment, the access and mobility management function indicates to a radio access network authorization to carry out resource management for direct vehicle-to-everything communication for the apparatus for a new radio access type, an evolved universal terrestrial radio access type, or a combination thereof.

In one embodiment, a method comprises: receiving information indicating a vehicle-to-everything capability of a remote unit; and transmitting a response to the information indicating the vehicle-to-everything capability of the remote unit, wherein the response indicates whether the remote unit is authorized to use the vehicle-to-everything capability.

In certain embodiments, the information indicating the vehicle-to-everything capability of the remote unit is transmitted during a registration procedure.

In some embodiments, the information indicating the vehicle-to-everything capability of the remote unit indicates whether vehicle-to-everything communication is supported.

In various embodiments, the information indicating the vehicle-to-everything capability of the remote unit indicates which vehicle-to-everything services are supported by the remote unit, and the vehicle-to-everything services comprise evolved universal terrestrial radio access, new radio, or a combination thereof.

In certain embodiments, a unified data management authorizes the remote unit to use the vehicle-to-everything capability.

In some embodiments, the unified data management indicates to an access and mobility management function which radio access types that the remote unit is enabled to use.

In various embodiments, the radio access types comprise evolved universal terrestrial radio access, new radio, or a combination thereof.

In one embodiment, the access and mobility management function indicates to a radio access network authorization to carry out resource management for direct vehicle-to-everything communication for the remote unit for a new radio access type, an evolved universal terrestrial radio access type, or a combination thereof.

In one embodiment, an apparatus comprises: a receiver that receives information indicating a vehicle-to-everything capability of a remote unit; and a transmitter that transmits a response to the information indicating the vehicle-to-everything capability of the remote unit, wherein the response indicates whether the remote unit is authorized to use the vehicle-to-everything capability.

In certain embodiments, the information indicating the vehicle-to-everything capability of the remote unit is transmitted during a registration procedure.

In some embodiments, the information indicating the vehicle-to-everything capability of the remote unit indicates whether vehicle-to-everything communication is supported.

In various embodiments, the information indicating the vehicle-to-everything capability of the remote unit indicates which vehicle-to-everything services are supported by the remote unit, and the vehicle-to-everything services comprise evolved universal terrestrial radio access, new radio, or a combination thereof.

In certain embodiments, a unified data management authorizes the remote unit to use the vehicle-to-everything capability.

In some embodiments, the unified data management indicates to an access and mobility management function which radio access types that the remote unit is enabled to use.

In various embodiments, the radio access types comprise evolved universal terrestrial radio access, new radio, or a combination thereof.

In one embodiment, the access and mobility management function indicates to a radio access network authorization to carry out resource management for direct vehicle-to-everything communication for the remote unit for a new radio access type, an evolved universal terrestrial radio access type, or a combination thereof.

In one embodiment, a method comprises: configuring a remote unit with information indicating a plurality of mobile networks and a radio access type of a plurality of radio access types for direct vehicle-to-everything communication corresponding to each mobile network of the plurality of mobile networks; and supporting a plurality of vehicle-to-everything applications, wherein each vehicle-to-everything application of the plurality of vehicle-to-everything applications communicates via a direct vehicle-to-everything communication using a corresponding radio access type of the plurality of radio access types.

In certain embodiments, the plurality of radio access types comprises evolved universal terrestrial radio access, enhanced evolved universal terrestrial radio access, new radio, or some combination thereof.

In some embodiments, the method further comprises configuring the remote unit with information indicating geographic areas for communication, wherein each geographic area of the geographic areas has a corresponding radio access type of the plurality of radio access types.

In various embodiments, the method further comprises receiving a trigger, from a vehicle-to-everything application of the plurality of vehicle-to-everything applications, to send a message via a vehicle-to-everything communication.

In one embodiment, the method further comprises selecting to send a message via a direct vehicle-to-everything communication and determining a radio access type of the plurality of radio access types for transmitting the message via the direct vehicle-to-everything communication.

In certain embodiments, in an autonomous mode, the remote unit determines the message radio access type based on configuration information received from a vehicle-to-everything control function.

In some embodiments, the message comprises a priority.

In various embodiments, the method further comprises determining a transmission radio access type of the plurality of radio access types for transmitting the message based on the priority.

In one embodiment, the method further comprises configuring the remote unit with a mapping between the priority and at least one radio access type of the plurality of radio access types.

In certain embodiments, the transmission radio access type of the plurality of radio access types for transmitting the message is determined based on the mapping.

In some embodiments, the method further comprises configuring the remote unit with a mapping between application identifiers corresponding to the plurality of vehicle-to-everything applications and at least one radio access type of the plurality of radio access types.

In one embodiment, an apparatus comprises: a processor that: configures the apparatus with information indicating a plurality of mobile networks and a radio access type of a plurality of radio access types for direct vehicle-to-everything communication corresponding to each mobile network of the plurality of mobile networks; and supports a plurality of vehicle-to-everything applications, wherein each vehicle-to-everything application of the plurality of vehicle-to-everything applications communicates via a direct vehicle-to-everything communication using a corresponding radio access type of the plurality of radio access types.

In certain embodiments, the plurality of radio access types comprises evolved universal terrestrial radio access, enhanced evolved universal terrestrial radio access, new radio, or some combination thereof.

In some embodiments, the processor configures the apparatus with information indicating geographic areas for communication, and each geographic area of the geographic areas has a corresponding radio access type of the plurality of radio access types.

In various embodiments, the apparatus further comprises a receiver that receives a trigger, from a vehicle-to-everything application of the plurality of vehicle-to-everything applications, to send a message via a vehicle-to-everything communication.

In one embodiment, the processor selects to send a message via a direct vehicle-to-everything communication and determines a radio access type of the plurality of radio access types for transmitting the message via the direct vehicle-to-everything communication.

In certain embodiments, in an autonomous mode, the processor determines the message radio access type based on configuration information received from a vehicle-to-everything control function.

In some embodiments, the message comprises a priority.

In various embodiments, the processor determines a transmission radio access type of the plurality of radio access types for transmitting the message based on the priority.

In one embodiment, the processor configures the apparatus with a mapping between the priority and at least one radio access type of the plurality of radio access types.

In certain embodiments, the transmission radio access type of the plurality of radio access types for transmitting the message is determined based on the mapping.

In some embodiments, the processor configures the apparatus with a mapping between application identifiers corresponding to the plurality of vehicle-to-everything applications and at least one radio access type of the plurality of radio access types.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A method comprising:
supporting a first plurality of applications for vehicle-to-everything communications;
receiving first configuration information from a network, wherein the first configuration information includes information indicating a selection of a radio access type for direct vehicle-to-everything communication for a list of one or more identifiers provided by the first plurality of applications;
receiving a request to transmit a vehicle-to-everything communication from an application of the first plurality of applications;
determining whether the vehicle-to-everything communication is to be transmitted via a direct communication with a mobile communication network or a direct vehicle-to-everything communication with other remote units;
determining a radio access type of the plurality of radio access types for transmitting the vehicle-to-everything communication via a direct vehicle-to-everything communication based on the first configuration information, wherein the plurality of radio access types comprises evolved universal terrestrial radio access and new radio;
selecting a cell of a plurality of cells that supports vehicle-to-everything resource management for the vehicle-to-everything communication via a direct vehicle-to-everything communication and the radio access type; and
requesting resources via the cell for transmitting the vehicle-to-everything communication via a direct vehicle-to-everything communication using the radio access type.

2. The method of claim 1, wherein an identifier provided by each vehicle-to-everything application of the plurality of vehicle-to-everything applications is a vehicle-to-everything application identifier.

3. The method of claim 2, further comprising determining the preemption of a first vehicle-to-everything application of the plurality of vehicle-to-everything applications based on a mapping of the vehicle-to-everything application identifier corresponding to the first vehicle-to-everything application to a preemption flag.

4. The method of claim 3, further comprising determining the cell that supports vehicle-to-everything resource management based on a vehicle-to-everything carrier frequency of the first vehicle-to-everything application of the plurality of vehicle-to-everything applications.

5. The method of claim 4, further comprising determining whether the cell supports vehicle-to-everything resource management based on a vehicle-to-everything carrier frequency of a second vehicle-to-everything application of the plurality of vehicle-to-everything applications.

6. The method of claim 5, further comprising determining that a second vehicle-to-everything application of the plurality of vehicle-to-everything applications cannot be preempted and, in response to the cell not supporting vehicle-to-everything resource management based on the vehicle-to-everything carrier frequency of the second vehicle-to-everything application of the plurality of vehicle-to-everything applications, selecting a different cell of the plurality of cells that supports vehicle-to-everything resource management and the carrier frequency of the second vehicle-to-everything application.

7. An apparatus comprising dual connectivity capability, the apparatus comprising:
a processor that supports a first plurality of applications for vehicle-to-everything communications;
a receiver that:
receives first configuration information from a network, wherein the first configuration information includes information indicating a selection of a radio access type for direct vehicle-to-everything communication for a list of one or more identifiers provided by the first plurality of applications;
receives a request to transmit a vehicle-to-everything communication from an application of the first plurality of applications;
determines whether the vehicle-to-everything communication is to be transmitted via a direct communication with a mobile communication network or a direct vehicle-to-everything communication with other remote units;
determines a radio access type of the plurality of radio access types for transmitting the vehicle-to-everything communication via a direct vehicle-to-everything communication based on the first configuration information, wherein the plurality of radio access types comprises evolved universal terrestrial radio access and new radio;
selects a cell of a plurality of cells that supports vehicle-to-everything resource management for the vehicle-to-everything communication via a direct vehicle-to-everything communication and the radio access type; and
requests resources via the cell for transmitting the vehicle-to-everything communication via a direct vehicle-to-everything communication using the radio access type.

8. The apparatus of claim 7, wherein an identifier provided by each vehicle-to-everything application of the plurality of vehicle-to-everything applications is a vehicle-to-everything application identifier.

9. The apparatus of claim 8, wherein the processor determines the preemption of a first vehicle-to-everything application of the plurality of vehicle-to-everything applications based on a mapping of the vehicle-to-everything application identifier corresponding to the first vehicle-to-everything application to a preemption flag.

10. The apparatus of claim 9, wherein the processor determines the cell that supports vehicle-to-everything resource management based on a vehicle-to-everything carrier frequency of the first vehicle-to-everything application of the plurality of vehicle-to-everything applications.

11. The apparatus of claim 10, wherein the processor determines whether the cell supports vehicle-to-everything resource management based on a vehicle-to-everything carrier frequency of a second vehicle-to-everything application of the plurality of vehicle-to-everything applications.

12. The apparatus of claim 11, wherein the processor determines that a second vehicle-to-everything application of the plurality of vehicle-to-everything applications cannot be preempted and, in response to the cell not supporting vehicle-to-everything resource management based on the vehicle-to-everything carrier frequency of the second vehicle-to-everything application of the plurality of vehicle-to-everything applications, selects a different cell of the plurality of cells that supports vehicle-to-everything resource management and the carrier frequency of the second vehicle-to-everything application.

* * * * *